United States Patent
Gonzalez et al.

(10) Patent No.: US 11,204,254 B2
(45) Date of Patent: Dec. 21, 2021

(54) IMPLEMENT GUIDANCE DISPLAY SYSTEM FOR WORK VEHICLES

(71) Applicant: Deere & Company, Moline, IL (US)

(72) Inventors: Juan Daniel Gonzalez, Coahuila (MX); Ignacio Alonso Martinez, Coahuila (MX)

(73) Assignee: DEERE & COMPANY, Moline, IL (US)

(*) Notice: Subject to any disclaimer, the term of this patent is extended or adjusted under 35 U.S.C. 154(b) by 273 days.

(21) Appl. No.: 16/424,772

(22) Filed: May 29, 2019

(65) Prior Publication Data
US 2020/0378782 A1    Dec. 3, 2020

(51) Int. Cl.
*G01C 21/36*    (2006.01)
*A01D 90/08*    (2006.01)
*B60R 1/00*    (2006.01)

(52) U.S. Cl.
CPC .......... *G01C 21/3647* (2013.01); *A01D 90/08* (2013.01); *B60R 1/00* (2013.01); *G01C 21/3676* (2013.01)

(58) Field of Classification Search
CPC ...... A01D 90/08; B60R 1/00; G01C 21/3647; G01C 21/3676
See application file for complete search history.

(56) References Cited

U.S. PATENT DOCUMENTS

| | | | | |
|---|---|---|---|---|
| 6,167,337 A | * | 12/2000 | Haack | E02F 9/26 222/63 |
| 2009/0116942 A1 | * | 5/2009 | Hackett | B28C 5/4272 414/335 |
| 2011/0196565 A1 | * | 8/2011 | Collins | G05D 1/0219 701/26 |

(Continued)

FOREIGN PATENT DOCUMENTS

| | | |
|---|---|---|
| EP | 3279133 A1 | 2/2018 |
| EP | 3409848 A1 | 12/2018 |

(Continued)

OTHER PUBLICATIONS

European Search Report issued in counterpart application No. 20176982.5 dated Dec. 15, 2020 (12 pages).

(Continued)

*Primary Examiner* — Terrell M Robinson
(74) *Attorney, Agent, or Firm* — Klintworth & Rozenblat IP LLP

(57) ABSTRACT

An implement guidance display system may be deployed onboard a work vehicle including an operator station and chassis. The implement guidance display system includes a display device within the operator station of the work vehicle, implement data sources configured to provide implement tracking data pertaining to work the implement when mounted to the chassis, and a controller in signal communication with the display device and with the implement data sources. The controller is configured to: (i) receive (Continued)

the implement tracking data from the implement data sources; (ii) establish a projected trajectory of the work implement utilizing the implement tracking data; and (iii) generate, on the display device, implement trajectory symbology indicative of the projected trajectory of the work implement.

19 Claims, 9 Drawing Sheets

(56) References Cited

U.S. PATENT DOCUMENTS

| | | | |
|---|---|---|---|
| 2013/0158784 A1* | 6/2013 | Fukano | E02F 9/262 |
| | | | 701/34.4 |
| 2014/0107897 A1 | 4/2014 | Zhu et al. | |
| 2014/0347483 A1* | 11/2014 | Nakanishi | B60P 1/045 |
| | | | 348/148 |
| 2017/0080976 A1 | 3/2017 | Choi et al. | |
| 2018/0072542 A1* | 3/2018 | Ishikawa | B66C 23/905 |
| 2018/0094408 A1* | 4/2018 | Shintani | E02F 9/264 |
| 2018/0277067 A1* | 9/2018 | Tentinger | G06F 3/012 |
| 2019/0093321 A1* | 3/2019 | Hiekata | E02F 3/96 |
| 2019/0360177 A1* | 11/2019 | Kiyota | G06T 11/00 |

FOREIGN PATENT DOCUMENTS

| | | |
|---|---|---|
| JP | S4931104 A | 3/1974 |
| WO | 2016168650 A1 | 10/2016 |
| WO | WO2018151280 A1 | 12/2019 |

OTHER PUBLICATIONS

European Search Report issued in counterpart application No. 20176982.5 dated Sep. 14, 2020 (14 pages).

Lexus, 2019 Lexus RX Luxury Crossover Safety Brochure, Lexus.com, 2019.

* cited by examiner

IMPLEMENT GUIDANCE DISPLAY SYSTEM FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to implement guidance display systems for use onboard work vehicles equipped with work implements.

ABBREVIATIONS

Abbreviations appearing relatively infrequently in this document are defined upon initial usage, while abbreviations appearing more frequently in this document are defined below:
HDD—Head down display;
HUD—Head up display;
FEL—front end loader; and
FOV—field of view.

BACKGROUND OF THE DISCLOSURE

Work vehicles are commonly equipped with specialized tools or work implements useful in performing tasks in the agricultural, forestry, construction, and mining industries. Certain work vehicles are equipped with a single work implement, which may be mounted to either the front end or the back end of a work vehicle. Other work vehicles may be equipped with both front and rear work implements. Depending on design, a work implement may be affixed to a work vehicle in a manner not intended for in-field removal, such as in the case of specialized work vehicles utilized in the forestry and construction industries. In other instances, a work implement may be mounted to a work vehicle in a modular fashion permitting the work implement to be readily interchanged with other work implements suited for varying work tasks. Such modular work implements are commonly utilized in conjunction with tractors, which may be capable of concurrently supporting both front and rear work implements.

In many instances, a work implement may be mounted to a particular end of a work vehicle through a boom assembly, which permits movement of the work implement in multiple degrees of freedom relative to the work vehicle chassis. Again referring to a tractor as an example, a loader bucket, a bale spear attachment, a bale squeeze, a grab fork, or another work implement may be removably mounted to the front end of the tractor by a hydraulically-actuated boom assembly. The boom assembly may allow movement of the work implement relative to the tractor chassis over a relatively broad range of motion and through positions limiting operator visibility of the work implement and its surrounding environment. Concurrently, the tractor may be navigated over fields or other work areas containing obstructions and uneven terrain. Such factors may render it difficult for an operator to consistently command movement of a work implement in an intended manner (e.g., along an optimal path in three dimensional space) when performing material handling operations and other tasks requiring relatively precise navigation of the work implement. Overall productivity levels may be reduced as a result, while undesirably high mental workloads are placed on the operator of the work vehicle.

SUMMARY OF THE DISCLOSURE

Implement guidance display systems are disclosed for usage onboard work vehicles. Embodiments of the implement guidance display system may be deployed onboard a work vehicle including an operator station, a work vehicle chassis, and a work implement mounted to move relative to the work vehicle chassis. The implement guidance display system can include, for example, a display device within the operator station of the work vehicle, implement data sources configured to provide implement tracking data pertaining to the work implement when mounted to the work vehicle chassis, and a controller in signal communication with the display device and with the implement data sources. During operation of the display system, the controller: (i) receives the implement tracking data from the implement data sources; (ii) establishes a projected trajectory of the work implement utilizing the implement tracking data; and (iii) generates, on the display device, implement trajectory symbology indicative of the projected trajectory of the work implement.

In further embodiments, the implement guidance display system is utilized onboard a work vehicle including an operator station, a work vehicle chassis, and a boom assembly to which varying types of work implements can be attached. The implement guidance display system includes a display device disposed within the operator station of the work vehicle, an implement attribute database storing implement-specific data for multiple work implement types, and a controller in signal communication with the display device and to the database. The controller is configured to: (i) identify a type of work implement currently attached to the work vehicle chassis by the boom assembly; (ii) recall, from the implement attribute database, implement-specific data corresponding to the identified type of work implement; and (iii) generate, on the display device, an implement guidance display including graphics indicating the type of work implement currently attached to the work vehicle chassis, as generated in accordance with the implement-specific data recalled from the implement attribute database.

In still other embodiments, the implement guidance display system is deployed onboard a work vehicle having a chassis supporting an operator station and a work implement configured to move relative to the work vehicle chassis. The implement guidance display system includes a display device within the operator station of the work vehicle. Implement data sources are configured to provide implement tracking data pertaining to an orientation of the work implement relative to the chassis or a combination of a heading of the work vehicle and the orientation of the work implement relative to the chassis. A controller is in signal communication with the display device and with the implement data sources. The controller is configured to receive the implement tracking data from the implement data sources, determine a projected trajectory of the work implement based on the implement tracking data; and generate, on the display device, implement trajectory symbology indicative of the projected trajectory of the work implement.

The details of one or more embodiments are set forth in the accompanying drawings and the description below.

Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
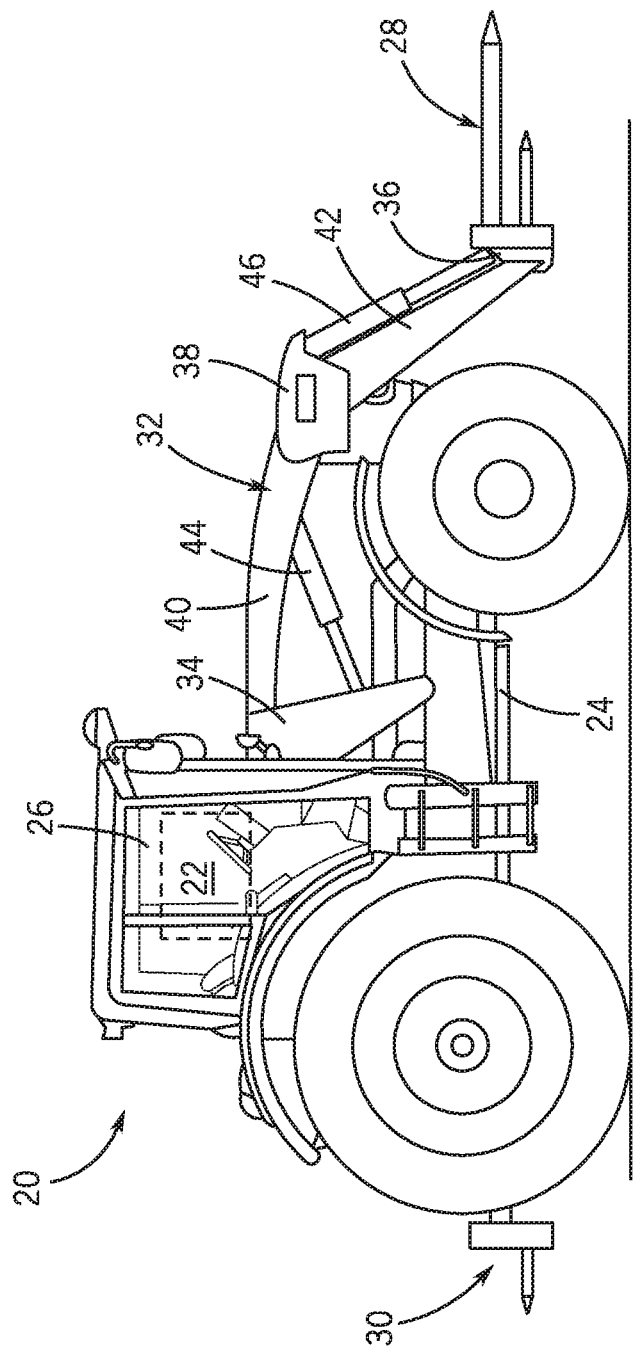
FIG. 1 is a side view of an example work vehicle (here, a tractor) equipped with an embodiment of an implement guidance display system according to this disclosure.

For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

The following describes embodiments of implement guidance display systems for usage onboard work vehicles equipped with (or equippable with) work implements. During operation, the implement guidance display system generates certain unique symbology or graphics (herein, "implement guidance symbology") assisting an operator of the work vehicle in controlling work implement movement in an intended, predictable, and precise manner. The implement guidance symbology may assume different forms and visually convey key informational items pertaining to the forecast movement of one or more work implements, whether due to independent movement of the work implement relative to a chassis of a work vehicle, due to movement of the work vehicle chassis itself, or a combination thereof. By providing such visual guidance or cues in the form of the below-described implement guidance symbology, embodiments of the implement guidance display system enhance operator awareness and efficacy to alleviate the mental workload placed on the operator and to improve the overall productivity levels in executing tasks, such as material handling operations, demanding relatively precise and/or repetitive work implement movement.

The implement guidance system may be employed to provide an operator of a work vehicle a graphical representation of a projected trajectory of the implement relative to a target to which the implement is to be applied. By way of example, the implement may be the bucket of a front-end loader that is directed at a pile of gravel. In such a case, the bucket may be raised and lowered by boom or loader arms as well as pivoted about a lateral axis (perpendicular to the heading or direction of travel of the work vehicle) to which the bucket mounts to the loader arms. In other examples, the work implement may have one or more additional degrees of freedom, such as being pivotal about a vertical or other upright axis and/or a longitudinal axis aligned with the direction of travel. Further, the work implement may be mounted to the work vehicle by an articulating or jointed boom linkage, which allows the work implement to be moved in three dimensions relative to the work vehicle and to orient the work implement in various attitudes relative to the work vehicle. The felling or saw head of a feller buncher is one such example in which the saw head is attached by an articulable wrist to a boom linkage mounted to the work vehicle so that the position and attitude of the saw head may be moved relative to the work vehicle essentially limitlessly.

The projection of the work implement trajectory may thus be effected by an assessment of only its motion (in terms of one or both of its spatial position and orientational attitude) relative to the work vehicle chassis, or this combined with an assessment of the heading of the work vehicle. The motion of the work implement may be a single degree of freedom motion such as a change of only its spatial position or its attitude relative to the work vehicle chassis (e.g., only a pivotal motion such as a bucket tilt), or it may be a multiple degree of freedom, compound motion affecting both its spatial position and attitude (e.g., raising/lowering on loader arms and tilting a bucket or extending/retracting, swinging and tilting a bucket on a boom linkage). In other contexts, such compound motion may include additional degrees of freedom. In the case of the saw head of a feller buncher, for example, this could include rotation about a fore-aft axis generally in the travel direction of the work vehicle.

In embodiments, the implement guidance symbology may include graphics visually identifying a path along which the work implement is projected to travel; e.g., as determined based upon the present orientation (e.g., spatial position and attitude) of the work implement, operator input commands controlling movement of the work vehicle chassis or the work implement itself (again, if independently movable relative to the chassis), and/or sensor data describing a current motion state of the work implement. Such graphics (herein, the "projected implement path graphic") may be aligned with the present orientation of the work implement, as generated on a display containing the implement guidance symbology (herein, an "implement guidance display"). The projected implement path graphic may also convey other useful information pertaining to the work implement, such as critical dimensions (e.g., a maximum width) of the work implement. Additionally, in at least some instances, a default, baseline, or "zero deviation" implement path graphic may be selectively generated in conjunction with the projected implement path graphic on the implement guidance display. When generated, the zero deviation implement path graphic usefully provides visual contrast with the projected implement path graphic, particularly when appreciably deviating from a zero deviation path; that is, the path traveled by the implement when in a predetermined vertical position (e.g., a lowered or near-ground position) and when the work vehicle chassis travels along a straight line in either a forward direction (when the implement guidance symbology pertains to a forward work implement) or a rearward direction (when the implement guidance symbology pertains to a rear work implement).

The zero deviation implement path graphic may correspond to the heading of the work vehicle chassis in some instances, for example, when the work implement is attached to the work vehicle in a manner in which its spatial position is fixed relative to the chassis. In such cases, the zero deviation implement path graphic may be considered a projected trajectory of the work vehicle. In other cases, the zero deviation implement path will diverge from the work vehicle heading such that it will not indicate the projected trajectory of the work vehicle. In such cases, or even if not, a work vehicle path graphic may be generated and visually displayed to the operator along with the implement trajectory graphic. Such a work vehicle trajectory path may be provided in both forward and reverse travel directions or when the work vehicle is stationary and steering input is provided by the operator or other onboard or remote steering controls.

In some cases, the graphics for the implement trajectory projection and the work vehicle trajectory projection (and the zero deviation implement path) may be the same or overlap completely if displayed concurrently on the same screen. However, typically the graphics will be displayed as the distinct projections that they represent. It may be, for example, that the work vehicle trajectory projection graphic takes a generally two dimensional planar form (such as when the work vehicle is on level ground and/or stationary), or it may take a generally three dimensional form following along or within a continuum of consecutive, adjacent or overlapping reference planes (such as when the work vehicle is on or traversing uneven terrain). The work implement trajectory projection may likewise take the form of a generally two dimensional planar graphic or follow or lie within a generally three dimensional continuum of planes. In all cases where the work vehicle trajectory differs from the work implement trajectory then, the graphics will be represented in different planes or planar continuums such that one is either spaced vertically from, but parallel with, the other, or at an angle thereto, such as an angle within an oblique plane or planes containing upright and forward/reverse travel direction components or upright and lateral/side-to-side (perpendicular to travel) components relative to the plane or planes of the work vehicle trajectory projection graphic.

Moreover, the heading or travel directional aspect of the work implement trajectory projection may or may not align with that of the work vehicle depending on the type of work implement and the degrees of freedom in its movement. For example, a work implement that is fixed in spatial position relative to the work vehicle chassis and can only pivot about one axis to change its attitude in one dimension will generally follow the heading of the work vehicle. However, the work vehicle heading may often differ from that for work implements with more degrees of freedom, such as those mounted by booms, wrists or various swivels or multidirectional knuckles.

Other implement guidance symbology potentially generated by the implement guidance display system includes graphical elements (e.g., markers or icons) identifying projected future orientation(s) of key feature(s) of the work implement, such as the leading bale spear tip(s) of a bale spear attachment, when the work implement reaches the far end or distal edge of the projected work implement path; the terms "far," "distal," "near," and "proximal," as appearing herein, defined based upon proximity to the work vehicle chassis. Embodiments of the implement guidance display system may also generate other graphics or symbology pertaining to work implement movement and positioning including, but not limited to: (i) graphical depictions of the type work implement currently mounted to the work vehicle (as usefully presented when the implement guidance display is generated as a HDD in which the actual work implement cannot be seen), (ii) graphics indicative of a current tilt angle of the work implement (when capable of tilting relative to the work vehicle chassis), and/or (iii) graphics visually denoting a projected path of the work vehicle chassis (herein, a "projected vehicle path graphic").

In various implementations, the implement guidance symbology may be generated in a three dimensional, perspective format and visually integrated into (e.g., overlaid or superimposed over) a real-world view of the environment surrounding a work implement. As an example, the implement guidance symbology may be generated on a HUD device having a transparent screen through which the surrounding environment of the work implement is viewed by an operator when seated within the operator station or cabin of a work vehicle. Additionally or alternatively, a live video feed may be presented on an HDD device (e.g., a monitor) located within the operator station, with the implement guidance symbology superimposed over or otherwise visually integrated into the live video feed and aligned with the present vertical position of the work implement (when movable relative to the work vehicle chassis). In other instances, the implement guidance symbology may be presented in the context of a virtual representation of the surrounding environment of the work vehicle; e.g., as may be the case when the implement guidance display is presented in a three dimensional (e.g., perspective or isometric) format, as seen from a vantage point offset from the work vehicle by some distance. In still further instances, the implement guidance display may be generated in a two dimensional format, such as horizontal situation (top-down) display or a vertical situation display. When generated as a horizontal situation or top-down display, in particular, the implement guidance symbology may again be integrated into a live video feed of the environment surrounding the work vehicle as captured by multiple cameras positioned around the work vehicle, with the camera feeds combined accordingly.

The implement guidance display system may generate any practical number of implement guidance displays on at least one display device situated within the operator station of the work vehicle; or, perhaps, carried into the operator station by an operator of the work vehicle. For example, in certain instances, the implement guidance display system may selectively generate: (i) a forward-looking display (herein, "a forward implement guidance display") presenting implement guidance symbology corresponding to a work implement mounted to a front end of a tractor or other work vehicle, and (ii) a rear-looking display (herein, "a rear implement guidance display") presenting implement guidance symbology corresponding to a work implement mounted to a rear end of the work vehicle. In such instances, the forward implement guidance display and rear implement guidance display may be generated concurrently on a single display device (e.g., in a side-by-side or picture-in-picture format), generated concurrently on different display devices, and/or generated in mutually exclusive manner on a single display device. In this latter regard, an operator may switch between presentation of the forward implement guidance display or the rear implement guidance display on the display device via interaction with the display device (e.g., via touch input if the display device is so capable) or utilizing another operator input device.

An example of a work vehicle equipped with the implement guidance display system will now be described with reference to FIGS. 1-9. In the below-described example, the work vehicle assumes the form of a tractor equipped with two work implements: an FEL bale spear attachment and a rear bale spear attachment. The following notwithstanding, it is emphasized that embodiments of the implement guidance display system are not restricted to usage in conjunction with any particular type of work vehicle, providing the work vehicle is equipped with (or can be equipped with) at least one work implement, regardless of whether of the work implement is movable relative to the body or chassis of the work vehicle. Generally, then, embodiments of the implement guidance display system can be integrated into a wide variety of work vehicles equipped with numerous types of work implements. To provide but a few additional examples, a non-exhaustive list of other work implements and work vehicles for which the embodiments of the display system may usefully generate implement guidance symbology includes the felling head of a feller buncher, the bucket (or other end effector) of an excavator, the blade of a dozer, and various other attachments (e.g., a bale squeeze, a fork lift, an FEL bucket, or the like) mounted to the front end or rear end of a tractor.

For purposes of this disclosure the term "work implement" and its derivatives refers to a component of a work vehicle, such as may be used in the agriculture, construction, forestry, mining or other such industries, that is attached to or is otherwise carried by a work vehicle and employed to impart a working action on something exogenous to the work vehicle itself. This includes the implements noted above as well as numerous other attachments and end effectors, and it excludes various other components of the machine, which, as part of the work vehicle, are for the purpose of operating the work vehicle itself. Examples of such work vehicle components that are excluded from the rubric of work implements as pertinent here include, but are not limited to, various engines, motors, actuators and steering mechanisms (including steerable and non-steerable (differential power) wheels).

Example of a Work Vehicle Equipped with an Implement Guidance Display System FIG. 1 is a side view of a work vehicle (here, a loader 20) equipped with an embodiment of the implement guidance display system, as generically represented by box 22 and discussed more fully below in connection with FIGS. 2-9. In addition to the implement guidance display system 22, the loader 20 includes a wheeled body or chassis 24 and an operator station or cabin 26. An FEL bale spear attachment 28 and a rear bale spear attachment 30 (here, a three point hitch attachment) are mounted to the front end and the rear end of the tractor chassis 24, respectively. The FEL bale spear attachment 28, in particular, is mounted to the front end of the tractor chassis 24 by a hydraulically-actuated boom assembly 32, which enables movement of the FEL bale spear attachment 28 relative to the tractor chassis 24 in multiple degrees of freedom. Comparatively, the rear bale spear attachment 30 is mounted to the rear end of the tractor chassis 24 in a fixed relationship such that the attachment 30 cannot move relative to the chassis 24. In further embodiments, however, the rear bale spear attachment 30 (or a different rear-mounted implement) may be mounted to the rear of the tractor chassis 24 by a boom assembly or, perhaps, in another manner permitting movement of the attachment 30 relative to the tractor chassis 24 in one or more degrees of freedom.

In the example of FIG. 1, the hydraulically-actuated boom assembly 32 includes an aft bracket 34 affixed to the tractor chassis 24, a forward bracket 36 to which the FEL bale spear attachment 28 is pivotally attached, and an intermediate or mid bracket 38 situated between the brackets 34, 36. Twin upper loader arms 40 (one of which can be seen in FIG. 1) pivotally attach the aft bracket 34 to the mid bracket 38, which is, in turn, attached to the forward bracket 36 by twin lower loader arms 42 (again only one of which can be seen). Twin hydraulic lift cylinders 44 are further mounted between the aft bracket 34 and the mid bracket 38, while twin hydraulic bucket cylinders 46 are mounted between the mid bracket 38 and the forward bracket 36. Non-illustrated hydraulic lines of the boom assembly 32 are further present and fluidly connected to a pressurized hydraulic fluid supply on the loader 20 in a manner permitting an operator seated within the operator station 26 to control the hydraulic cylinders 44, 46.

An operator can command the boom assembly 32 to lift the FEL bale spear attachment 28 from the illustrated home orientation (that is, the non-tilted, lowered position) by controlling the hydraulic lift cylinders 44 to extend in a desired manner. As the hydraulic lift cylinders 44 extend, the FEL bale spear attachment 28 lifts from the lowered home orientation shown in FIG. 1, travels through an intermediate or mast level position, and is ultimately raised to a full height position located above the operator station 26. Similarly, as the hydraulic bucket cylinders 46 retract in response to operator commands, the boom assembly 32 tilts the FEL bale spear attachment 28 from forward-facing angular orientation shown in FIG. 1 toward an increasingly upright orientation; that is, such that the bale spears included in the FEL bale spear attachment 28 rotate upwardly toward the front hood or windshield of the loader 20. Conversely, from the full height position, the operator can control the boom assembly 32 to stroke the hydraulic cylinders 44, 46 in an opposing to return the FEL bale spear attachment 28 to the lowered, non-tilted, lowered position shown in FIG. 1. The operator may control the cylinders 44, 46 to extend and retract, as desired, through movement of a suitable control interface (e.g., a joystick) located within the operator station 26 of the loader 20.

Figure 2:
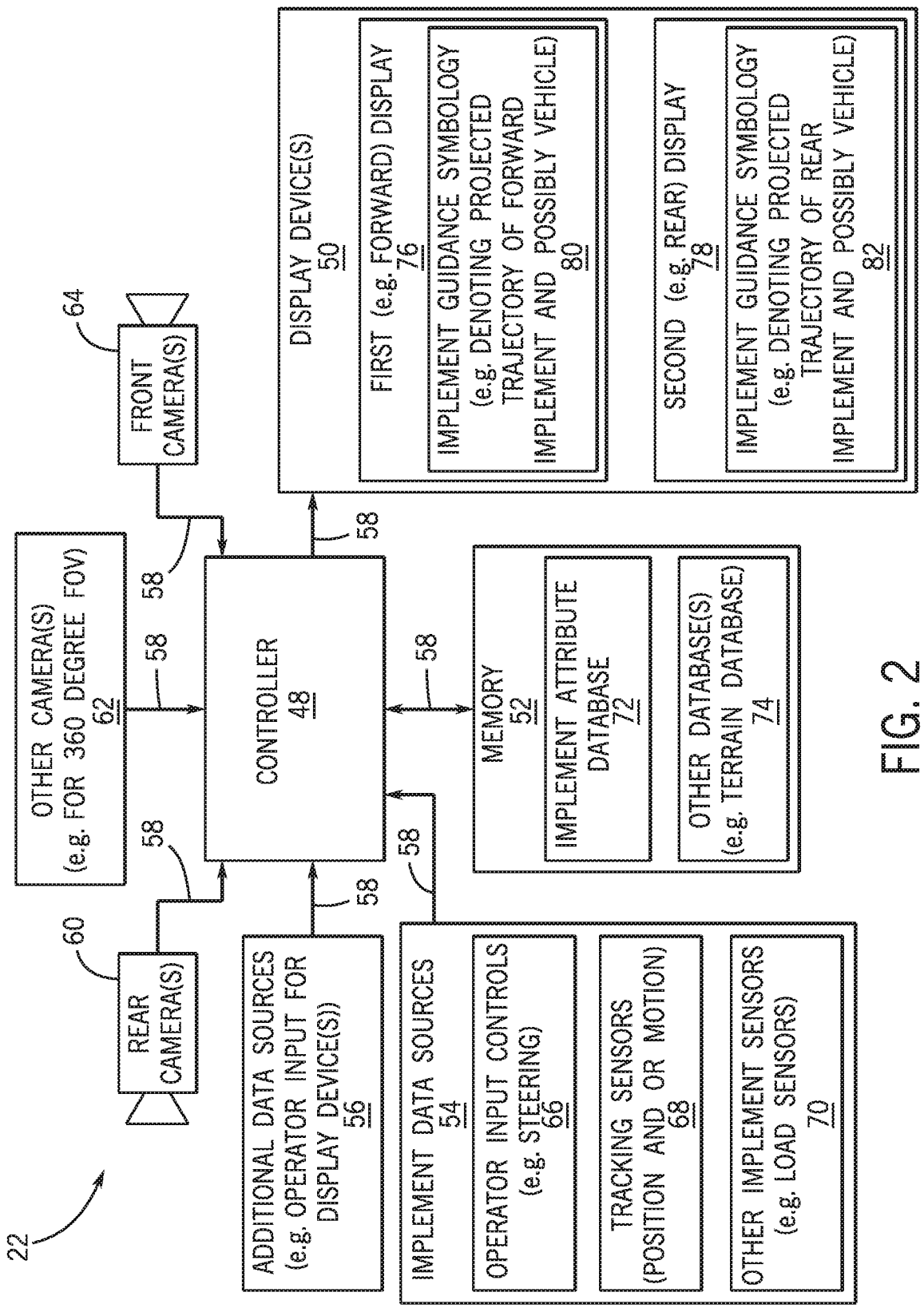
FIG. 2 is a schematic illustrating various components, all or some of which are suitably included in the example implement guidance display system shown in FIG. 1.

Advancing to FIG. 2, several components suitably included in the implement guidance display system 22 (FIG. 1) are illustrated in accordance with an example embodiment of the present disclosure. As schematically shown, the implement guidance display system 22 may include the following components or subsystems, each of which may assume the form of a single device or multiple interconnected devices: (i) a controller 48, (ii) at least one display device 50, (iii) computer-readable storage media or memory 52, (iv) one or more implement data sources 54, and (v) one or more additional data sources 56. The foregoing components can be operably coupled utilizing any suitable combination of wireless or wired (e.g., bus) connections 58. Further, in implementations in which the below-described implement guidance symbology is superimposed over or otherwise visually integrated into a live video feed (or multiple video feeds) of the surrounding environment of the wok implement(s) joined to the loader 20, the implement guidance display system 22 may further include one or more cameras 60, 62, 64.

As appearing herein, the term "implement data source" refers broadly to any device, system, or sensor providing data relating to a work implement mounted to a work vehicle. The implement tracking data may include, for example, information pertaining to the present or predicted movement of a work vehicle chassis, as well as the present or predicted movement of a work implement when movable relative to a work vehicle chassis. Thus, utilizing the FEL bale spear attachment 28 mounted to the loader 20 (FIG. 1) as an example, the implement data sources 54 can include the operator input controls 66 utilized to control movement of the tractor chassis 24, such as the below-described steering wheel 88 (see FIGS. 3-5). Additionally, the implement data sources 54 may include those operator input controls 66 utilized to control movement of the boom assembly 32, such as the below-described joystick 90 (see again FIGS. 3-5).

The implement data sources 54 may further include one or more implement tracking sensors 68 for monitoring the current orientation, including spatial position and attitude, of the work implement relative to the work vehicle chassis, when the work implement is independently movable relative thereto; e.g., as in the case of the FEL bale spear attachment 28 (FIG. 1) mounted to the front end of the loader 20 by the hydraulically-actuated boom assembly 32. The sensors 68 can assume the proximity sensors, displacement sensors (e.g., for measuring hydraulic piston stroke), or any other devices capable of providing data from which the present orientation of a work implement relative to the work vehicle chassis (e.g., the tractor chassis 24) can be ascertained. Furthermore, in certain embodiments, the FOV of one or more cameras mounted to the loader 20 may encompass the range of motion of a work implement, such as the FEL bale spear attachment 28 shown in FIG. 1. In such cases, the controller 48 may further perform image analysis of video feed(s) provided by such cameras to the present orientation of a work implement (e.g., the FEL bale spear attachment 28) at a given juncture in time. Information regarding past and present orientations of the FEL bale spear attachment 28 (or another independently-movable work implement) may also be tracked, stored in the memory 52, and then recalled from memory 52 by controller 48 as desired.

In more complex embodiments, the controller 48 may consider the present motion state of the work implement in establishing the projected trajectory of the work vehicle implement. In such embodiments, implement tracking sensors 68 may further include sensors for monitoring not only the orientation of the work implement, but sensors for directly monitoring the motion state of the FEL bale spear attachment 28 (or other work implement). In this regard, one or more accelerometers or gyroscopes may be mounted to the FEL bale spear attachment 28 and/or to regions of the boom assembly 32 in embodiments. When present, such sensors may also be utilized to determine the tilt angle the FEL bale spear attachment 28, when this information is utilized by the implement guidance display system 22 in generating the below-described implement guidance symbology. In some embodiments, a multi-axis accelerometer and a multi-axis gyroscope implemented as Microelectromechanical System (MEMS) devices and packaged as, for example, an Inertial Measurement Unit (IMU) may be utilized; e.g., affixed to the FEL bale spear attachment 28 or to the distal end of the boom assembly 32 for capturing such data. Displacement measurements may further be considered over a predetermined time period to determine the motion state of a work implement relative to the work vehicle chassis by monitoring change in positioning over time. Any or all such data may be fed back to the controller 48 on a real-time or near real-time basis and utilized in combination with (or in lieu of) the operator input commands received from the input controls 66 in determining the present orientation and motion state of the FEL bale spear attachment 28 to project the trajectory of the attachment 28. In still other instances, the implement guidance display system may lack such sensors, providing that the present orientation of any independently-movable work implements (e.g., the FEL bale spear attachment 28) can be determined by the controller 48 as needed.

Other types of sensors 70, which convey additional data or measurements relating to a given work implement, may further be included in the implement data sources 54 in at least some implementations of the implement guidance display system 22. Such additional implement sensors 70 can include sensors providing data from which the load state of a work implement may be determined; that is, whether the work implement is presented fully loaded, unloaded, or perhaps partially loaded. Various types of implement sensors 70 can be utilized for this purpose including, for example, force sensors measuring the load carried by an implement at a given time, distance measuring equipment for determining when an object is engaged by an implement, and/or cameras providing video feeds from which the load state of a work implement can be determined by the controller 48 through image analysis. In other instances, such additional implement sensors 70 may be omitted from the implement guidance display system 22.

With continued reference to FIG. 2, the controller 48 of the implement guidance display system 22 can assume any form suitable for performing the functions described throughout this document. Further, the term "controller," as appearing herein, is utilized in a non-limiting sense to generally refer to the processing architecture of the implement guidance display system 22. The controller 48 can encompass or be associated with one or more processors, control computers, navigational equipment pieces, computer-readable memories (including or in addition to the memory 52), power supplies, storage devices, interface cards, and other standardized components. The controller 48 may also include or cooperate with any number of firmware and software programs or computer-readable instructions designed to carry-out the various process tasks, calculations, and control/display functions described herein.

The memory 52 can encompass any number and type of storage media suitable for storing computer-readable code or instructions, as well as other data utilized to support the operation of the implement guidance display system 22. Further, although illustrated as a separate block in FIG. 2, the memory 52 may be integrated into the controller 48 in embodiments as, for example, a system-in-package, a system-on-a-chip, or another type of microelectronic package or module. In embodiments, the memory 52 may store at least one local database 72, 74 utilized in generating the below-described implement guidance symbology. For example, in certain implementations, the memory 52 may store an implement attribute database 72 containing information pertaining to different implement types, such as critical dimensions, key physical attributes, and/or files containing different graphical depictions of varying types of work implement. As a more specific example, in embodiments in which varying types of work implements can be attached to a work vehicle, as in the case of the loader 20 shown in FIG. 1, the controller 48 may be configured to determine the type of work implement currently attached to the work vehicle and then generate certain implement-specific graphics corresponding to the determined type of work implement, as recalled from the database 72, when generating one or more implement guidance displays. Further discussion of this is provided below. Finally, in certain cases, the memory 52 may also contain other types of database(s) 74, such as a terrain database storing information relating to the topology, key geographical features, and/or terrain type of swaths of land over which the loader 20 may travel. In still other embodiments, the display system 22 may lack any either or both of database(s) 72, 74.

In embodiments of the implement guidance display system 22, the display device 50 may be affixed to the static structure of the operator station 26 and realized in either HDD or HUD configuration. Alternatively, the display device 50 may be freely movable relative to the static structure of the operator station 26; and may assume the form of, for example, a near-to-eye display device or other operator-worn display device. When assuming the form of an operator-worn display device or when assuming the form of a HUD device affixed to the work vehicle operator station 26, the screen of the display device 50 may be fully or partially transparent and the below-described implement guidance symbology may be superimposed on or over the "real-world view" of the environment surrounding a work implement, as seen through the transparent display screen. The term "real-world," as appearing herein, refers to the actual view of the surrounding environment or work area of a work implement, as opposed to a virtual or synthetic recreation thereof. In still further embodiments, the display device 50 can assume the form of a portable electronic display device, such as a tablet computer or laptop, which is carried into the work vehicle operator station (e.g., the operator station 26 of the loader 20) by an operator and which communicates with the various other components of the implement guidance display system 22 over a physical or wireless connection to perform the below-described display functionalities.

During operation, the implement guidance display system 22 generates one or more implement guidance displays 76, 78, each including implement guidance symbology 80, 82, on the display device(s) 50. For example, as schematically indicated in FIG. 2, the implement guidance display system 22 may generate a forward implement guidance display 76 and/or a rear implement guidance display on the display device(s) 50. In some instances, the implement guidance display system 22 may generate the displays 34, 36 concurrently. For example, in this case, the implement guidance displays 34, 36 may be presented on separate screens of multiple display devices 50 or, instead, on a single screen of one display device 50 in a picture-in-picture or side-by-side format. More commonly, however, the implement guidance display system 22 may generate the implement guidance displays 76, 78 in a mutually exclusive fashion; that is, such that only one of the forward implement guidance display 76 and the rear implement guidance display 78 are presented on the display device(s) a given point in time. In this latter regard, the operator may be permitted to switch between a desired implement guidance display 76, 78 utilizing suitable operator controls, which may be located on or near the display device 50. Alternatively, the controller 48 may automatically select the appropriate guidance display 76, 78, based upon the particular direction in which the work vehicle 20 is presently traveling and/or the particular work implement currently controlled by the operator. Still other types of implement guidance displays may be generated on the display device(s) 50 during operation of the implement guidance display system 22, as further discussed below in connection with FIGS. 7 and 8.

Figure 3:
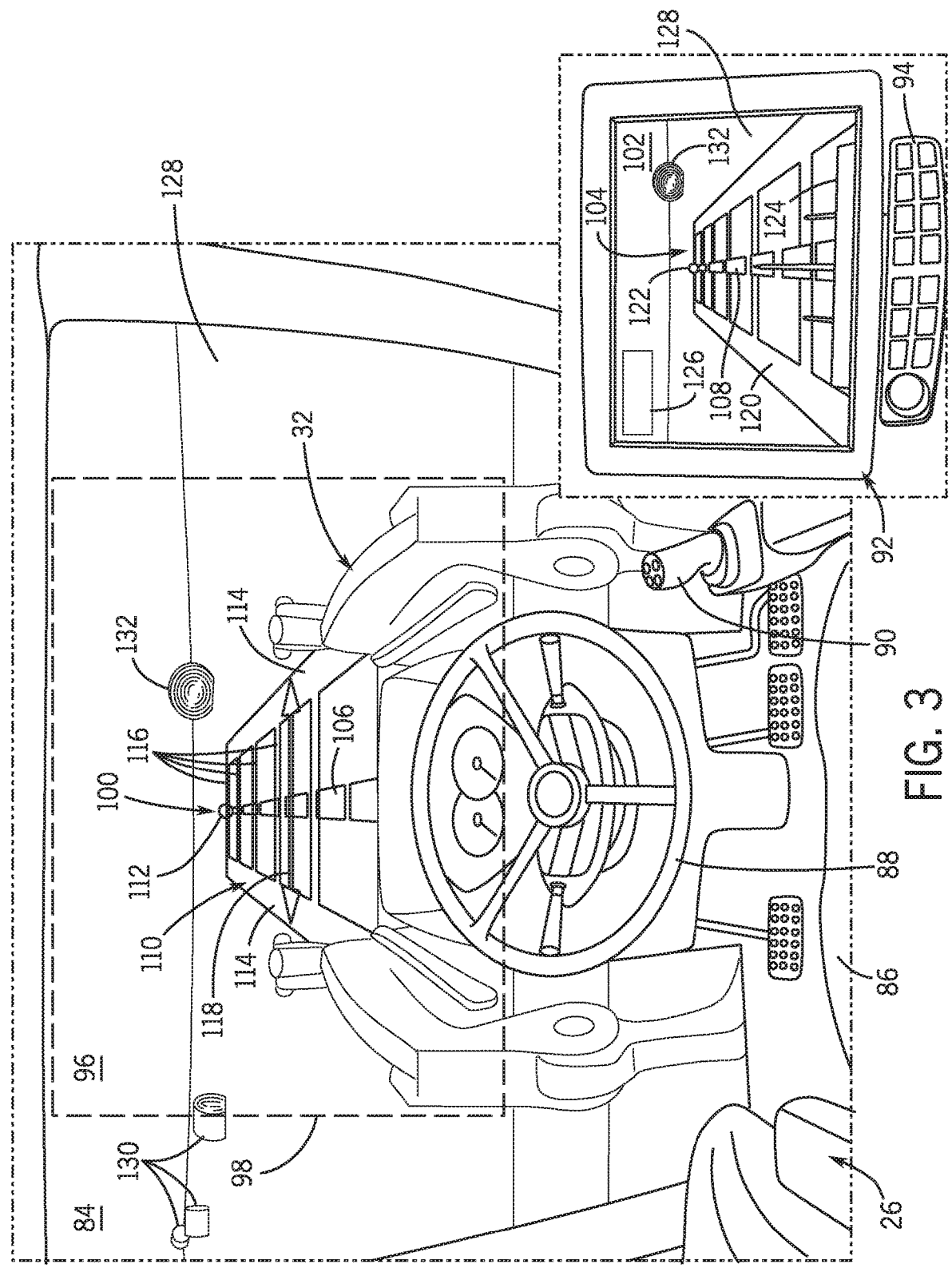
FIGS. 3-5 illustrate a forward implement guidance display as presented on a HUD device (center) and an HDD device or monitor (lower right), either or both of which may be included in the example implement guidance display system of FIG. 2.

Progressing next to FIG. 3, there is shown example forward view from the operator station 26 of the loader 20 when equipped with an embodiment of the display system 22. Here, it can be seen that the loader 20 includes a forward windshield or windscreen 84 through which the environment surrounding the FEL bale spear attachment 28 (hidden from view) can be seen. An operator's seat 86 (partially shown) is located within the operator station 26, positioned behind a steering wheel 88, and located adjacent a joystick 90. An HDD device or monitor 92, as further shown in the bottom right of FIG. 3, may also be located within the operator station 26 of the loader 20 along with various other operator input controls, such as a button cluster 94 found immediately below the monitor 92. In the illustrated example, the implement guidance display system 22 is depicted as generating two different types or formats of implement guidance displays, each including similar implement guidance symbology. The first example implement guidance display is a HUD 96, which is generated on a HUD device represented by dashed box 98 (hereafter, "HUD device 98") and including implement guidance symbology 100. The second example implement guidance display is an HDD 102, which is generated on the monitor 92 (an HDD device) and which likewise includes implement guidance symbology 104.

While two different implement guidance displays (the HUD 96 and the HDD 102) are depicted as concurrently generated in the example of FIG. 3 (and further in FIGS. 4 and 5 discussed below), the implement guidance display system 22 may (and often will) generate only one of the HUD 96 and the HDD 102 in embodiments. The HUD 96 and the HDD 102 are both shown in FIG. 3 for two reasons. First, the HUD 96 and the HDD 102 contain similar symbology and are thus conveniently described together. Second, the illustrated example of the loader 20 including an implement guidance display realized as both a HUD (the HUD 96) and an HDD (the HDD 102) further emphasizes that the implement guidance displays described herein can be generated in various different formats and manners; and, in many instances, may be selectable or customizable by an operator of the loader 20 (or the tractor supplier). The HUD 96 and the HDD 102 are both forward implement guidance displays in the illustrated example and, therefore, each generally correspond to the forward implement guidance display 76 in FIG. 2.

The HUD device 98 may include a transparent screen encompassing at least the dashed box region (the HUD 96) shown in FIG. 3, as perceived by an operator of the loader 20 when seated in the operator seat 86. The transparent screen can be affixed to the static infrastructure within the operator station 26 or, instead, worn by the operator in some manner. In either case, the implement guidance symbology 100 may be generated in a three dimensional perspective format corresponding to the real-world view through the transparent screen of the HUD device 98. Additional techniques can be utilized, as appropriate, to better integrate or blend the implement guidance symbology 100 into the real-world view seen through the HUD device 98. Such techniques can include masking of certain regions of the implement guidance symbology 100 when intersecting obstacles or geographical features ahead of the loader 20, when such obstacles or geographical features are known to the implement guidance display system 22; e.g., due to the inclusion of distance measuring equipment within the display system 22, inclusion of the terrain topology database 74, or the like.

The particular symbology included in the implement guidance symbology 100 presented on the HUD 96 will vary between embodiments and can potentially vary in a single embodiment over time depending upon, for example, user customization and/or certain dynamic factors, as discussed below. The following discussion will now focus on the forward view from the loader 20 shown in FIGS. 3-5 and, therefore, movement of the FEL bale spear attachment 28 (FIG. 1) attached to the forward tractor end by the boom assembly 32. The following discussion pertains equally to other types of work implements mounted to the boom assembly 32, such as an FEL bucket, bale squeeze, forklift attachment, or the like, in which case certain graphics and aspects of graphics included in the implement guidance symbology (e.g., the below-described spear tip markers and the width of the below-described projected implement path graphic) will vary accordingly.

In the example of FIG. 3, the implement guidance symbology 100 generated on the example HUD 96 includes at least two primary graphical features or elements: (i) a projected implement path graphic 110, and (ii) a leading spear tip marker 112. The graphic 110 and marker 112 may be more broadly referred to as "implement trajectory symbology" herein as each of these visual elements or graphics are indicative of projected trajectory or path along with the implement under consideration (here, the FEL bale spear attachment 28) is predicted to travel, as determined by the controller 48 of the display system 22 based on the implement tracking data provided thereto. In other instances, different types of implement trajectory symbology may be generated on the implement guidance display in addition to or in lieu of the projected implement path graphic 110 and the leading spear tip marker 112. For example, in certain cases, a symbol or graphic representative of the implement under consideration and presented in a non-obstructive manner (e.g., rendered as partially transparent) may be generated on the HUD 96 (or other implement guidance display) to visually denote a projected future orientation of the implement.

Addressing the graphic 110 appearing on the HUD 96 in greater detail, the projected implement path graphic 110 provides a visual representation of a path along which the implement under consideration (here, the FEL bale spear attachment 28) is forecast to travel by the controller 48. By way of non-limiting example, the projected implement path graphic 110 is imparted with track-like or path-like appearance in the illustrated embodiment. Specifically, the projected implement path graphic 110 is produced to resemble a track or pathway having two forward-extending segments 114, which extend into the distance in a forward direction away from the front end of the loader 20; and a number of horizontally-extending or laterally-extending rungs 116, which extend between forward-extending segments 114. The provision of the rungs 116 provides the viewer with a sense of distance as the rungs 116 becomes shorter in perceived width with increasing distance from the operator station 26, again noting that the projected implement path graphic 110 is generated in perspective (as opposed to isometric) format in this example. The projected implement path graphic 110 thus visually conveys a projected or forecast path that will be traveled by the FEL bale spear attachment 28 for a predetermined distance ahead of the loader 20.

In embodiments, the controller 48 of the display system 22 usefully generates the projected implement path graphic 110 to align with the present orientation of the FEL bale spear attachment 28 for rapid visual association therewith. In this regard, the controller 48 may repeatedly determine a current vertical position of the FEL bale spear attachment 28 (or other work implement) relative to the tractor chassis 24 and then generate or update the HUD 96 to align the implement trajectory symbology (specifically, the projected implement path graphic 110) with the current vertical position of the attachment 28. Additionally, the actual width of the projected implement path graphic 110 (identified in FIG. 3 by double-headed arrow 118) may be substantially equivalent to a maximum width of the FEL bale spear attachment 28 in embodiments; the term "substantially equivalent," as appearing herein, denoting a disparity of less than 10%. Here, the actual width of the projected implement path graphic 110 may be constant over its length (taken in a forward direction), but may appear to grow smaller with increasing distance from the loader 20 as the path graphic 110 is generated in a perspective format. An operator can thus glance at the projected implement path graphic 110 at any point along its length and generally determine the location of the outer edges of the attachment 28, as projected into a future timeframe. This may be useful in increasing operator awareness as to the likely location of the FEL bale spear attachment 28 as the attachment 28 moves along the path identified by the projected implement path graphic 110 to determine if, for example, an outer edge of the attachment 28 is likely to come into close proximity of, or perhaps impact, a nearby obstacle.

As shown in FIG. 3, a graphic 106 representative of the projected trajectory or path of the tractor chassis 24 (herein, the "projected vehicle path graphic 106") can further be generated on the HUD 96 in addition to the projected implement path graphic 110 and/or the leading spear tip marker 112. In the illustrated example, the projected vehicle path graphic 106 assumes the form of a dashed centerline; however, in other implementations, the projected vehicle path graphic 106 may have alternative appearances, such as that of two parallel tracks similar or identical to that shown in FIG. 8. In embodiments, the projected vehicle path graphic 106 and the projected implement path graphic 110 may be graphically projected or mapped onto the same plane, as seen from the perspective of the operator station 26. It will be appreciated, however, that the projected implement path graphic 110 may be graphically projected onto a separate plane, which may be tilted or angled relative to the plane onto which the projected vehicle path graphic 106 is mapped when the FEL bale spear attachment 28 is forecast to move vertically. Alternatively, the projected implement path graphic 110 may be graphically projected or mapped onto a plane extending parallel to the plane onto which the projected vehicle path graphic 106 is mapped when the FEL bale spear attachment 28 resides at a different (e.g., raised) vertical position, but is not forecast to move vertically by the controller 48 of the display system 22. In other embodiments, the projected vehicle path graphic 106 may be visually integrated into the HUD 96 in another manner (e.g., by mapping onto the topology of the terrain if known) or omitted from the HUD 96 altogether.

Discussing next marker 112, the leading spear tip marker 112 visually indicates the projected location of the leading tip of the longest spear or spears (here, the central spear) included in the FEL bale spear attachment 28 when the FEL bale spear attachment 28 reaches the far terminal end (the distal end) of the path represented by the projected implement path graphic 110. In other embodiments, additional spear tip markers (perhaps, having a varied, less pronounced appearance) may be generated by the display system 22 to call-out the projected future locations of the other spear tips included in the FEL bale spear attachment 28. Generally, the provision of the leading spear tip marker 112 may draw operator attention to the center position of the FEL bale spear attachment 28 when reaching the end of its projected path of travel; and, more importantly, may assist the operator in better visualizing the future location at which this key physical feature of the FEL bale spear attachment 28 is predicted to arrive given the present set of conditions governing implement navigation. Again, such conditions may include the present vertical position of the FEL bale spear attachment 28 relative to the tractor chassis 24, any operator input commands currently received controlling movement of the tractor chassis 24 or the boom assembly 32, and/or (in at least some embodiments) any data received by the controller 48 describing the current motion state of the attachment 28 and/or tractor chassis 24. Further, if the topology of the surrounding terrain is known (e.g., from data stored in the database 74) or can be measured by sensors aboard the loader 20, this information may also be considered in establishing the predicted trajectory of the FEL bale spear attachment 28 and, therefore, in positioning the leading spear tip marker 112 (and in generating the projected implement path graphic 110) on the HUD 96.

In certain embodiments, vertical displacement between the leading spear tip marker 112 and the distal terminal edge of the projected implement path graphic 110 (that is, the edge of the graphic 110 furthest the viewer in perspective) may denote changes in the tilt angle of the FEL bale spear attachment 28. For example, as the tilt angle of the FEL bale spear attachment 28 pitches in an upward direction such that the tip of the leading bale spear included in the attachment 28 rotates toward an upright attitude (in a counterclockwise direction in FIG. 1), the leading spear tip marker 112 may move upwardly relative to the distal terminal edge of the projected implement path graphic 110, perhaps in proportion to the change in tilt angle. In other embodiments, a numerical readout or other graphic may be presented indicating the tilt angle of the FEL bale spear attachment 28 (or other work implement attachment to the loader 20). As a still further possibility, the implement guidance display system 22 may omit the leading spear tip marker 112 or any other graphic indicating the tilt angle of the FEL bale spear attachment 28.

The present example notwithstanding, the symbols or graphics constituting the implement guidance symbology 100 will vary between embodiments. Accordingly, the general appearance of the projected implement path graphic 110 and the leading spear tip marker 112 (if present) may differ in alternative embodiments; and, in certain cases, the appearance of these graphics may be customizable by the operator (or the tractor supplier) utilizing a suitable control or programming interface. Any or all of the graphical features making-up the implement guidance symbology 100 may also be generated in a partially transparent format (less than 100% opacity) in embodiments to avoid visually obstructing the view of the work area surrounding the FEL bale spear attachment 28. Different color coding schemes and animation effects may also be applied to the implement guidance symbology 100, as desired. An operator may also be permitted turnoff or deactivate the implement guidance symbology 100 in certain embodiments.

Discussing next the HDD 102 shown in the lower right of FIG. 3, the illustrated HDD 102 includes various implement guidance symbology 104 corresponding to the implement guidance symbology 100 shown in the above-described HUD 96 generated on HUD device 98. A does the HUD implement guidance symbology 100, the HDD implement guidance symbology 104 includes a projected implement path graphic 120 and a spear tip marker 122 (more broadly, "implement trajectory symbology 120, 122"). As was previously the case, the projected implement path graphic 110 visually denotes a predicted or forecast path traveled by the FEL bale spear attachment 28 (or another implement attached to the front end of the loader 20) as the loader 20 moves or continues to move in a forward direction. Similarly, the leading spear tip marker 122 may identify the location at which the leading tip of the longest, central spear projecting from the FEL bale spear attachment 28 is projected to arrive when the FEL bale spear attachment 28 reaches the end of the forecast path represented by the projected implement path graphic 120. The other description set-forth above with respect to the projected implement path graphic 110 and the leading spear tip marker 112 further applies equally to the projected implement path graphic 120 and the leading spear tip marker 122 of the HDD 102, respectively. Also, if desired, a projected vehicle path graphic 108 (analogous to the projected vehicle path graphic 108 appearing on the HUD 96) can further be generated on the HDD 102 in addition to or in lieu of the projected implement path graphic 120 and the leading spear tip marker 122.

A live camera feed is presented on the screen of the HDD 102, as captured by a forward-looking camera mounted to the loader 20; e.g., the front camera 64 identified in FIG. 2. The projected implement path graphic 120 and the leading spear tip marker 122 are thus overlaid or superimposed over this live video feed, while being presented in a three dimensional perspective format corresponding to the real-world environment captured by the video feed. In the example of FIG. 3 in which the FEL bale spear attachment 28 is not captured by the camera FOV presented on the HDD 102, a graphical representation or depiction 124 of the implement (hereafter, "implement graphic 124") is further presented on a lower portion of the HDD 102 to represent the FEL bale spear attachment 28. The implement graphic 124 may be moved vertically along the HDD 102, perhaps while generated in a partially transparent format or generated as a smaller, less obstructive graphic, as the FEL bale spear attachment 28 is raised or lowered to indicate the current position of the FEL bale spear attachment 28 relative to the tractor chassis 24. The near or proximal edge of the projected implement path graphic 110 may likewise move along with the implement graphic 124, as appropriate. In other embodiments, the implement graphic 124 may not move to avoid visually obstructing the implement guidance HDD 102, while only the proximal edge of the projected implement path graphic 110 moves vertically in accordance with the current height of the FEL bale spear attachment 28 relative to the tractor chassis 24 (or to the ground). Finally, a textual annunciation or readout 126 may be further provided to identify the type of display currently presented on the HDD 102, as may be useful when the operator is permitted to switch between the presentation of different types of implement guidance displays on the HDD 102 in the manner described below.

In the example scenario shown in FIG. 3, the FEL bale spear attachment 28 currently resides in the home orientation (the non-tilted, lowered position) shown in FIG. 1. Further, at this juncture in time, operator input commands have not been received requesting variance in the orientation of the FEL bale spear attachment 28 relative to the tractor chassis 24 or attempting to turn the loader 20 from a straight path. Consequently, the loader 20 is either presently traveling in a purely forward direction along a straight path; or is presently stationary, but will travel forward along a straight path if commanded or permitted to accelerate in a forward direction. It can further be seen in the example of FIG. 3 that the loader 20 is located on a field 128 across which a number of hay bales 130, 132 are distributed. For the purposes of the following discussion, it is assumed that the operator of the loader 20 wishes to secure the hay bale 132 for transport utilizing the FEL bale spear attachment 28.

Figure 4:
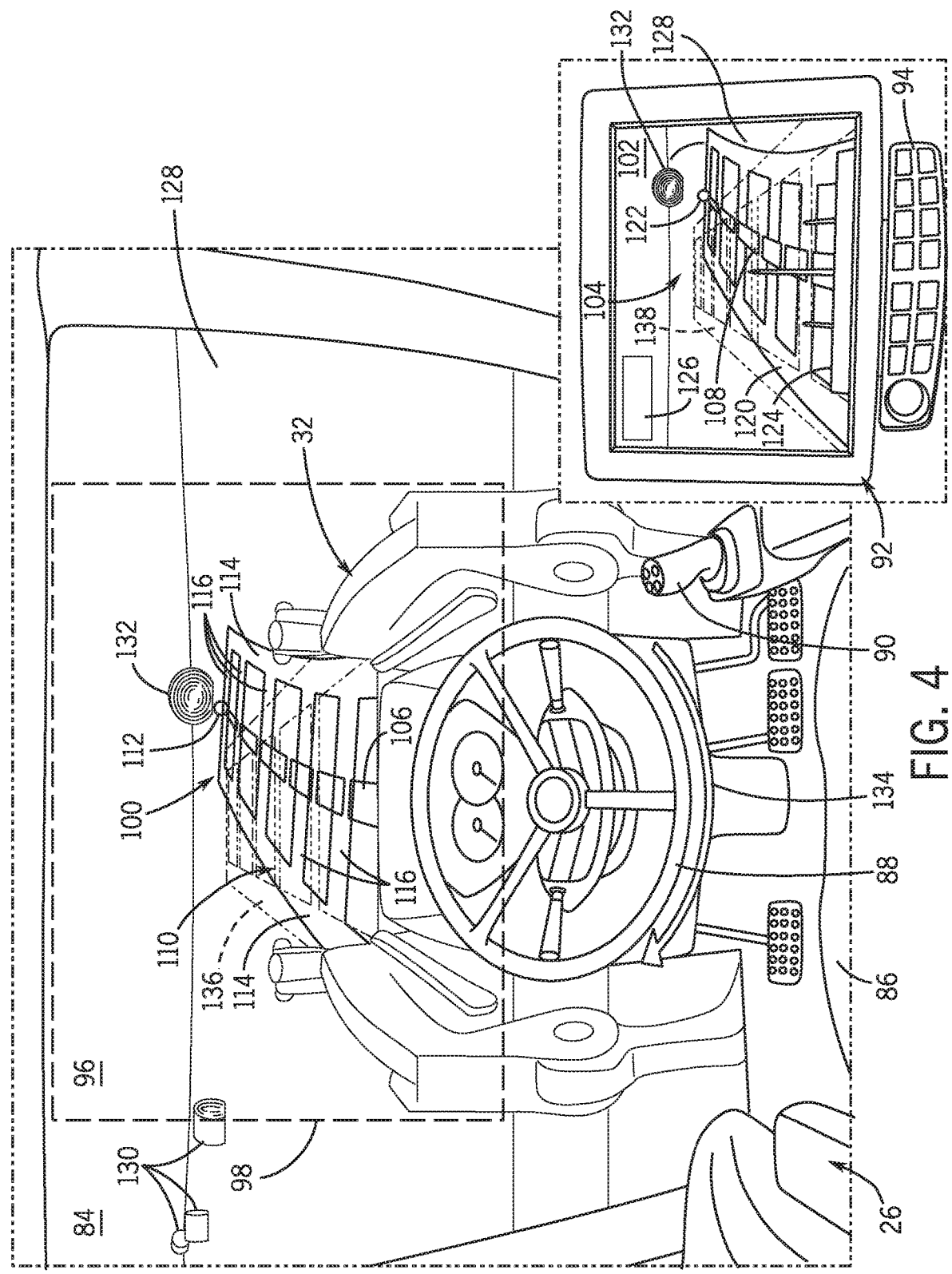

By glancing at the implement guidance symbology 110 on the HUD 96 or the implement guidance symbology on the HDD 102, as shown in FIG. 3, the operator can easily determine that the loader 20 should be turned to the right by some amount when traveling forward toward the hay bale 132 to properly engage the FEL bale spear attachment 28 into the targeted hay bale 132. Thus, the operator may turn the steering wheel 88 to place the FEL bale spear attachment 28 on a trajectory intersecting the targeted hay bale 132. As shown in FIG. 4 (wherein an arrow 134 indicates turning of the steering wheel 88), this results in a corresponding bending of the projected implement path graphic 110 on the HUD 96 and the projected implement path graphic 120 on the HDD 102. By reference to the either or both of the graphics 110, 120, the operator can quickly determine whether the steering angle input is appropriate to place the FEL bale spear attachment 28 on a course intersecting the targeted hay bale 132, iteratively adjusting the steering wheel angle as needed. Further, the operator may further visually reference either or both of the leading spear tip markers 112, 122 to determine if the central spear of the FEL bale spear attachment 28 is properly aligned with the center or centerline of the targeted hay bale 132 such that this spear may engage into a central portion of the hay bale 132 as the loader 20 progresses forward. In this manner, the implement guidance symbology 100, 104 provides an intuitive guidance cue enabling an operator to navigate the FEL bale spear attachment 28 into engagement with the targeted hay bale 132 in a reliable and precise manner.

In the example shown in FIG. 4, the controller 48 of the implement guidance display system 22 further generates a baseline or "zero deviation" implement path graphic 136 on the HUD 96, as well as a zero deviation implement path graphic 138 on the HDD 102. The zero deviation implement path graphics 136, 138 each indicate the trajectory of the FEL bale spear attachment 28 when in a predetermined home orientation (the lowered, near-ground position) and traveling a straight (zero deviation) path in a forward direction. A visual contrast is thus created between the zero deviation implement path graphics 136, 138 and the projected implement path graphics 110, 120 to visually emphasize or highlight the degree to which the projected implement path graphics 110, 120 diverge from the zero deviation path, whether by turning of the loader 20 (as shown in FIG. 4) or by vertical movement of the FEL bale spear attachment 28 (as shown and discussed below in conjunction with FIG. 5). When generated on either or both of the HDD 102 and HUD 96, the zero deviation implement path graphics 136, 138 may be generated in a different color than the projected implement path graphics 110, 120, rendered partially transparent (e.g., to resemble a shadow or ghost image), or otherwise imparted with a varied appearance to provide contrast with the graphics 110, 120 and to avoid visually cluttering the depicted implement guidance displays.

Figure 5:
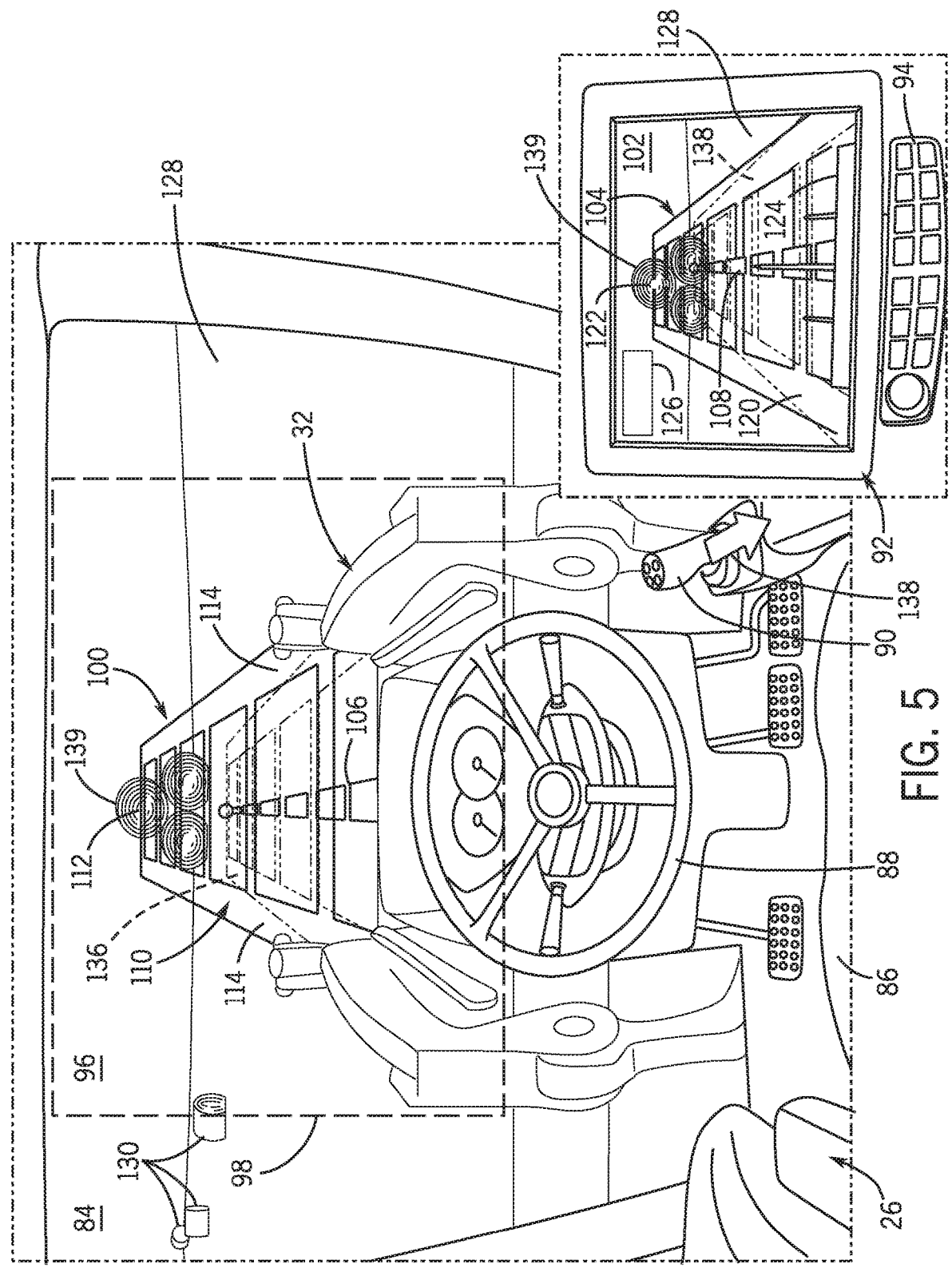

Turning next to FIG. 5, a further example scenario is illustrated in which the operator of the loader 20 desires to engage the FEL bale spear attachment 28 into the uppermost hay bale 139 included in a stack of hay bales present on the field 128. Accordingly, the operator may command the boom assembly 32 to raise the FEL bale spear attachment 28 to an elevation generally matching that of the uppermost hay bale 139; e.g., by moving the joystick 90 in toward the body of the operator in the manner indicated by arrow 138 in FIG. 5. Upon receipt of this operator input command, the controller 48 varies the projected implement path graphics 110, 120 accordingly such that the far end or distal end of the path represented by the graphics 110, 120 is lifted to an increased elevation as compared to the near end or proximal end of the path represented by the graphics 110, 120. The degree to which the distal end of the path represented by the graphics 110, 120 may depend upon the displacement of the joystick 90; the length of the projected path represented by graphics 110, 120; and possibly other factors (e.g., the inclination of topology of the terrain ahead of the loader 20 if known to the display system 22). Additionally, the leading spear tip markers 112, 122 are also positioned to indicate the corresponding vertical change in the predicted position of the central spear of the FEL bale spear attachment 28 when arriving at the terminal end of the path represented by the graphics 110, 120. An operator can thus visually reference the implement guidance symbology 100 generated on the HUD 96 and/or the implement guidance symbology generated on the HDD 102 to guide the FEL bale spear attachment 28 into engagement with the targeted hay bale 132 in a reliable and precise manner.

There has thus been described one manner in which the example implement guidance display system 22 can produced unique symbology on an implement guidance display, whether generated as HUD or an HDD, to assist an operator of work vehicle in navigating a work implement in an intended manner. In the above-described example, the implement guidance displays are generated in a forward-looking, three dimensional perspective format; however, in further embodiments, the display system 22 may generate other types of implement guidance display(s) in addition to or in lieu of such forward-looking, three dimensional displays. For example, in certain instances, the implement guidance display system 22 may further generate a rear implement guidance display as described below in connection with FIG. 6.

Figure 6:
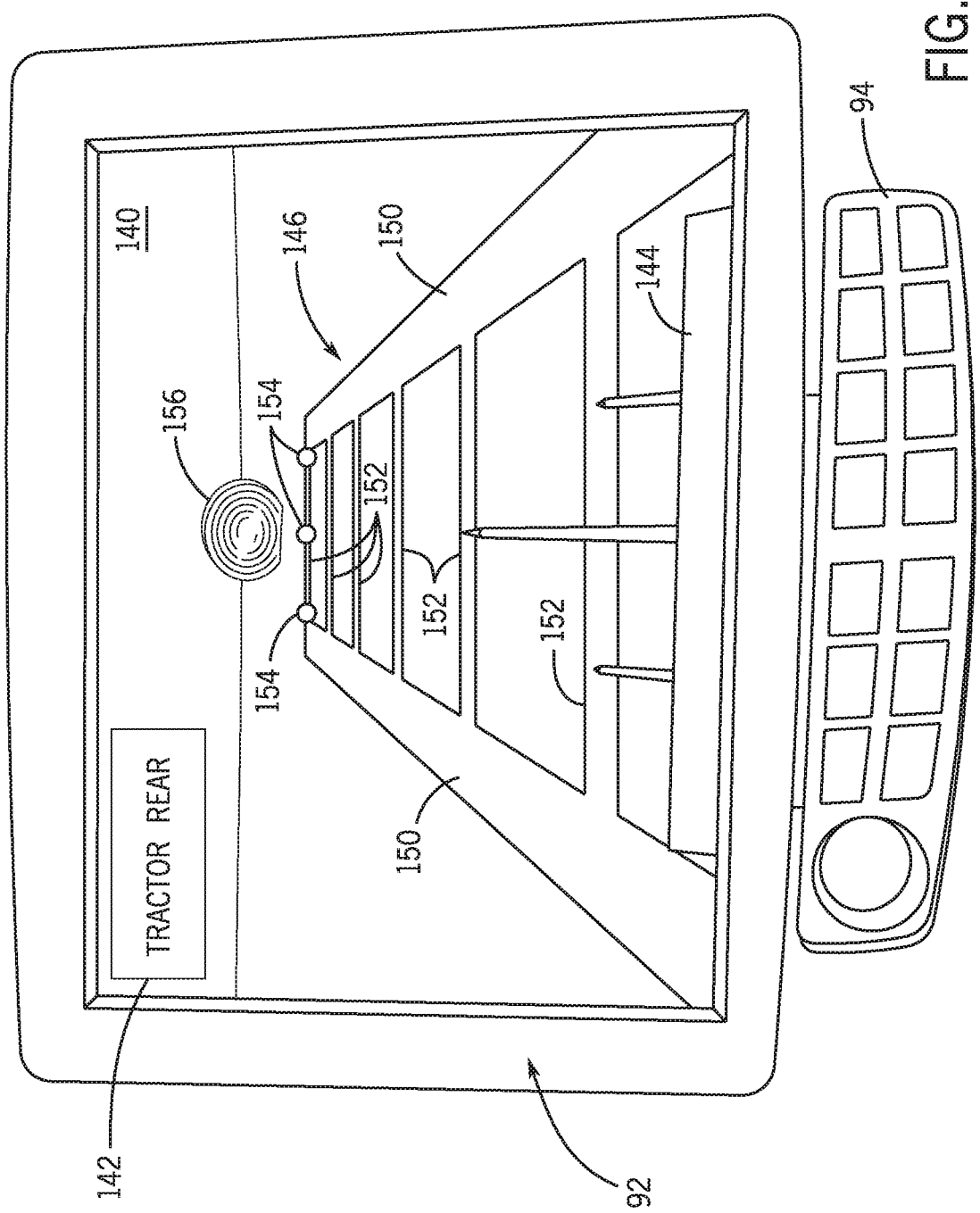
FIG. 6 illustrates a rear implement guidance display, as presented on the monitor shown in FIG. 5, which may be selectively generated by the example implement guidance display system in addition to or in lieu of the forward implement guidance display shown in FIGS. 3-5.
Figure 7:
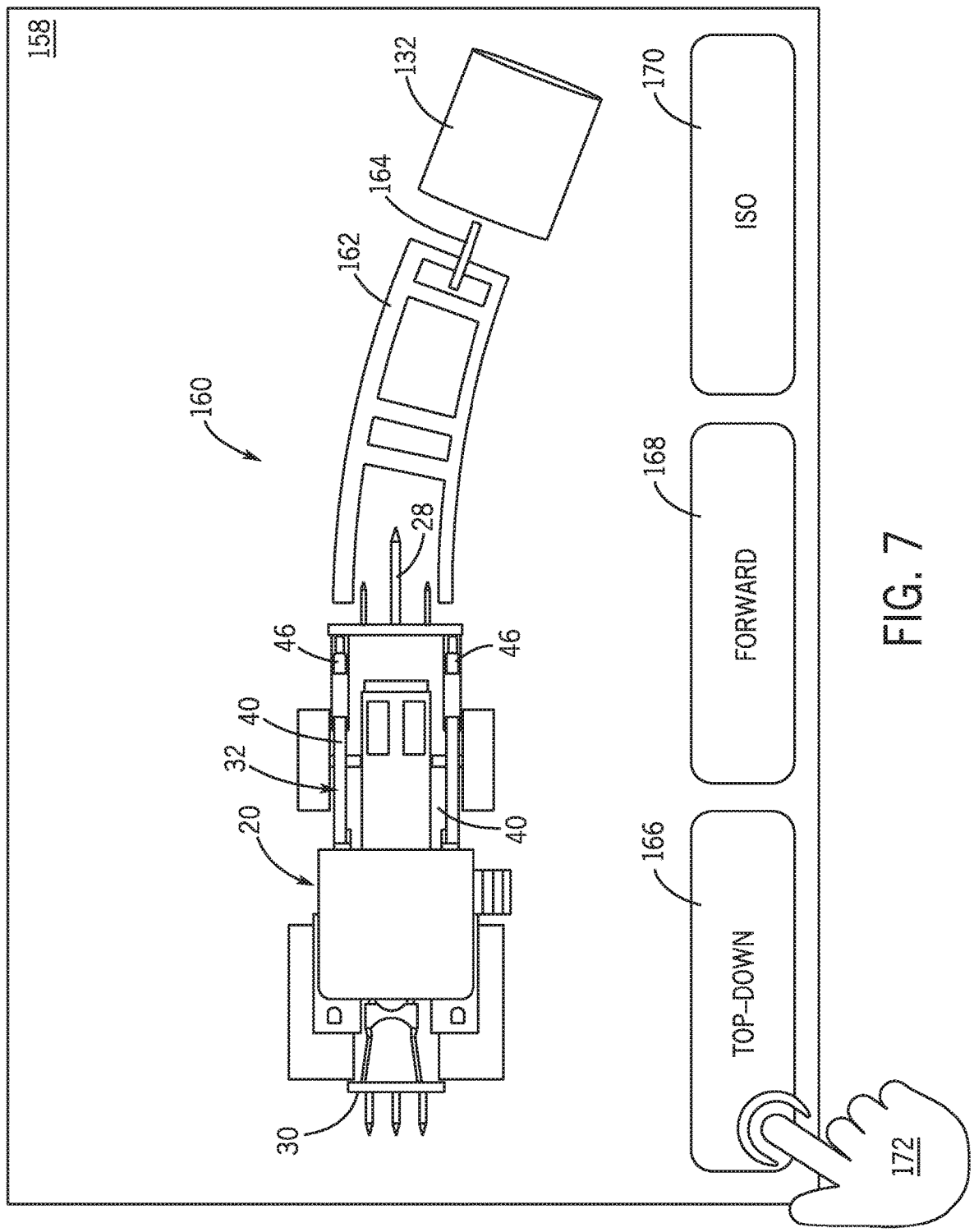
FIGS. 7 and 8 illustrate top-down and isometric implement guidance displays, respectively, which may be generated by the example implement guidance display system in addition to or in lieu of the implement guidance displays shown in FIGS. 3-6.
Figure 8:
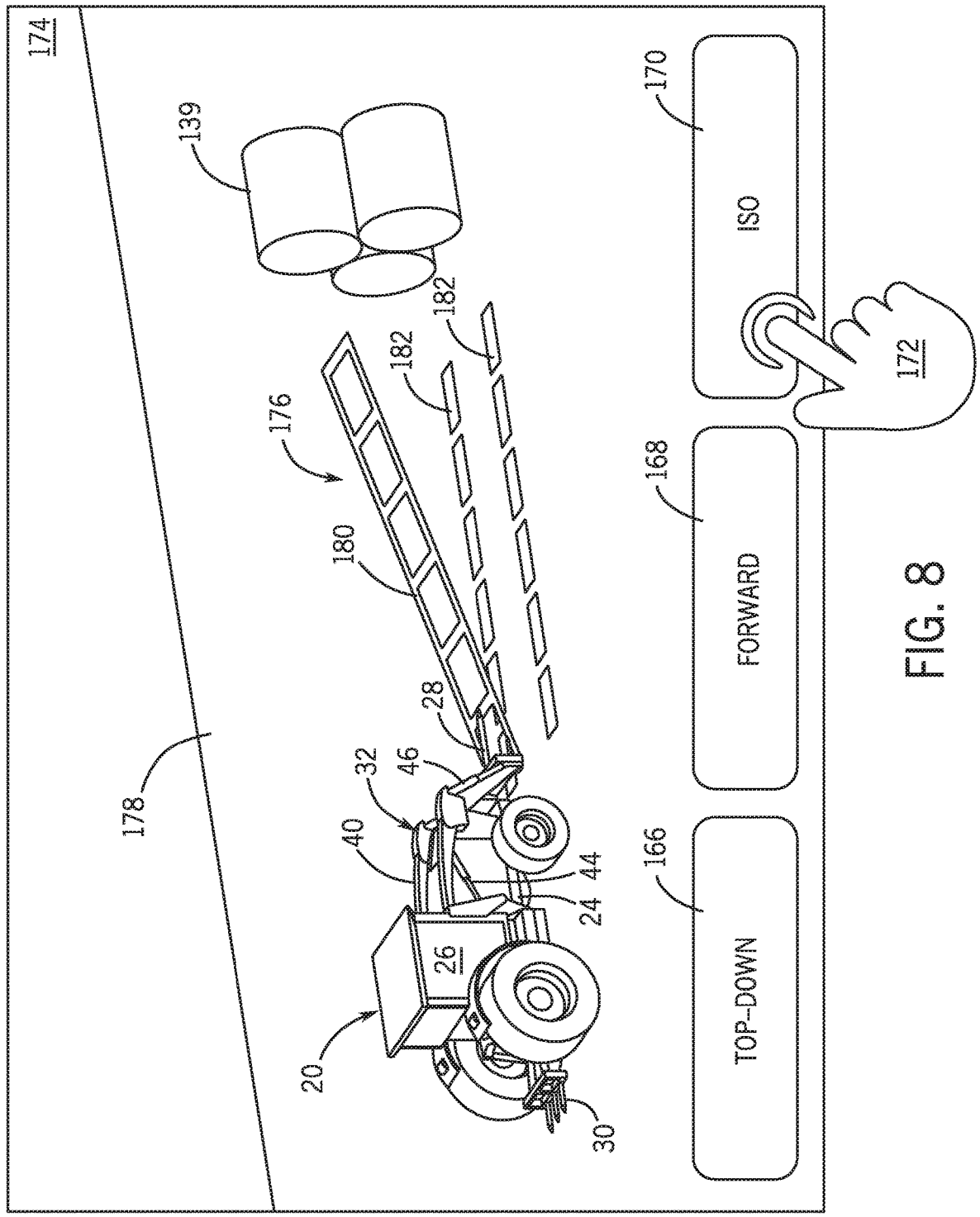

Turning to FIG. 6, a rear implement guidance display 140 may be generated on the monitor 92 by the implement guidance display system 22 in embodiments. Here, a live video feed of the area to the rear or aft of the loader 20 is captured by one or more cameras (e.g., by the rear camera 60 in FIG. 2) and presented on the monitor 92. A text annunciation or readout 142, as appearing in the upper left region of rear implement guidance display 140, indicates that a tractor rear view is currently displayed on the monitor 92. Once again, an implement-specific graphic 144 is produced representative of a depiction of the work implement under consideration; here, the rear bale spear attachment 30 shown in FIG. 1. Implement guidance symbology 146 is further generated on the rear implement guidance display 140 and includes: (i) a projected implement path graphic 148 (including forward-extending segments 150 and laterally-extending rungs 152, as previously described), and (ii) a number of spear tip markers 154. In this example, three spear tip markers 154 are generated on the implement guidance HDD 140 as the rear bale spear attachment 30 includes three leading bale spears, the markers 154 generated to have an appropriate positioning and spacing corresponding to the real-world work implement. The spear tip markers 154 thus identify the projected future orientations of the bale spears of spear attachment 30 when the reaching the distal edge of the projected implement path represented by the graphic 148. In other embodiments, the projected implement path graphic 148 or the spear tip markers 154 may be omitted from the rear implement guidance display 140. Once again, by glancing at the rear implement guidance display 140, an operator can determine if the projected path of the rear implement (the rear spear attachment 30) is on an appropriate trajectory to engage the chosen target, such as the hay bale 156 shown to the rear of the loader 20 in FIG. 6.

During operation, embodiments of the implement guidance display system 22 usefully permit an operator of the loader 20 to switch between presentation of the forward implement guidance display (e.g., the HDD 102 shown in FIGS. 3-5) or the rear implement guidance display (e.g., the HDD 140 shown in FIG. 6) on the monitor 92. The operator input switching between these (and possibly other) implement guidance displays can be received in various different manners. For example, such operator input may be received via touch input with the monitor 92 (if possessing touchscreen capabilities), by interaction with the button cluster 94 below the monitor 92, or via interaction with another operator input device located within the operator station 26 of the loader 20 (generically represented by input controls 66 in FIG. 2). In other instances, the controller 48 of the display system 22 may automatically select the appropriate guidance display 76, 78 to present on the monitor 92 at a given juncture in time based upon the particular direction in which the work vehicle 20 is presently traveling and/or the particular work implement currently controlled by the operator.

Still other types of implement guidance displays may be generated on the display device(s) 50 during operation of the implement guidance display system 22. For example, and referring now to FIG. 7, the implement guidance display system 22 may further generate a horizontal situation or top-down implement guidance display 158 including implement guidance symbology 160 in at least some embodiments. When generated, such a top-down implement guidance display 158 may depict the surrounding environment of the loader 20 (or other work vehicle). The surrounding environment of the loader 20 may be virtually represented on a monitor or display device in embodiments, potentially while rendering certain terrain features (e.g., terrain type and geographical features) in accordance with data stored in the terrain database 74 (if present). Alternatively, when the tractor is equipped with multiple cameras 60, 62, 64 providing multiple camera feeds which a 360 degree view of the surrounding environment of the loader 20 can be combined or "stitched together," a top-down implement guidance display 158 may be generated to include a live video feed of the surrounding environment. For consistency with the previous examples, the implement guidance symbology 160 is again generated to include a projected implement path graphic 162 and a spear tip marker 164 of the type previously described in conjunction with FIGS. 3-6. Further, the example in FIG. 7 generally corresponds with the example shown in FIG. 4 in which the loader 20 is steered by an operator to turn toward the targeted hay bale 132. Thus, again, the operator may visually reference the implement guidance symbology 160 shown in FIG. 7 to ensure that the FEL bale spear attachment 28 is properly engaged into the hay bale 132 as loader 20 progresses forward.

An operator may switch between presentation of the top-down implement guidance display 158 and other available implement guidance display utilizing any suitable user interface. For example, as further indicated in FIG. 7, three virtual buttons 166, 168, 170 may be presented and selected by an operator when desired utilizing, for example, cursor device or via touch input (represented by touch icon 172). In a further exemplary scenario, an operator may select display of an isometric view by selection of the button 170 shown in the lower right corner of the implement guidance display 158. Such input thus summons an isometric implement guidance display, such as the isometric implement guidance display 174 shown in FIG. 8. Here, the implement guidance display 174 includes implement guidance symbology 176, which is situated in a virtual or synthetic three dimensional environment surrounding a graphical depiction of the loader 20. The terrain 178 within the syntenic environment may be generated to have a flat topology, as shown; or, instead, may be generated to conform to the topology of the real-world terrain surrounding the loader 20, if such topology is known to the display system 22 from information stored in the database 74 or in some other manner. The implement guidance symbology 176 is once again generated to include a projected implement path graphic 180, as previously described. Additionally, in the example of FIG. 8, a projected vehicle path graphic 182 is further generated to visually denote the projected trajectory of the tractor chassis 24. In this example, the projected vehicle path graphic 182 is generated to appear as two parallel tracks (e.g., represented by dashed lines) having a predetermined lateral spacing, which may or may not correspond to a maximum width of the loader 20. An operator may thus reference the implement guidance symbology 176 to control movement of the tractor chassis 24 and the boom assembly 32 to ensure that the FEL bale spear attachment 28 properly engages into the targeted hay bale 139 (corresponding to the example of FIG. 5) as the loader 20 moves forward toward the illustrated hay bale stack.

Figure 9:
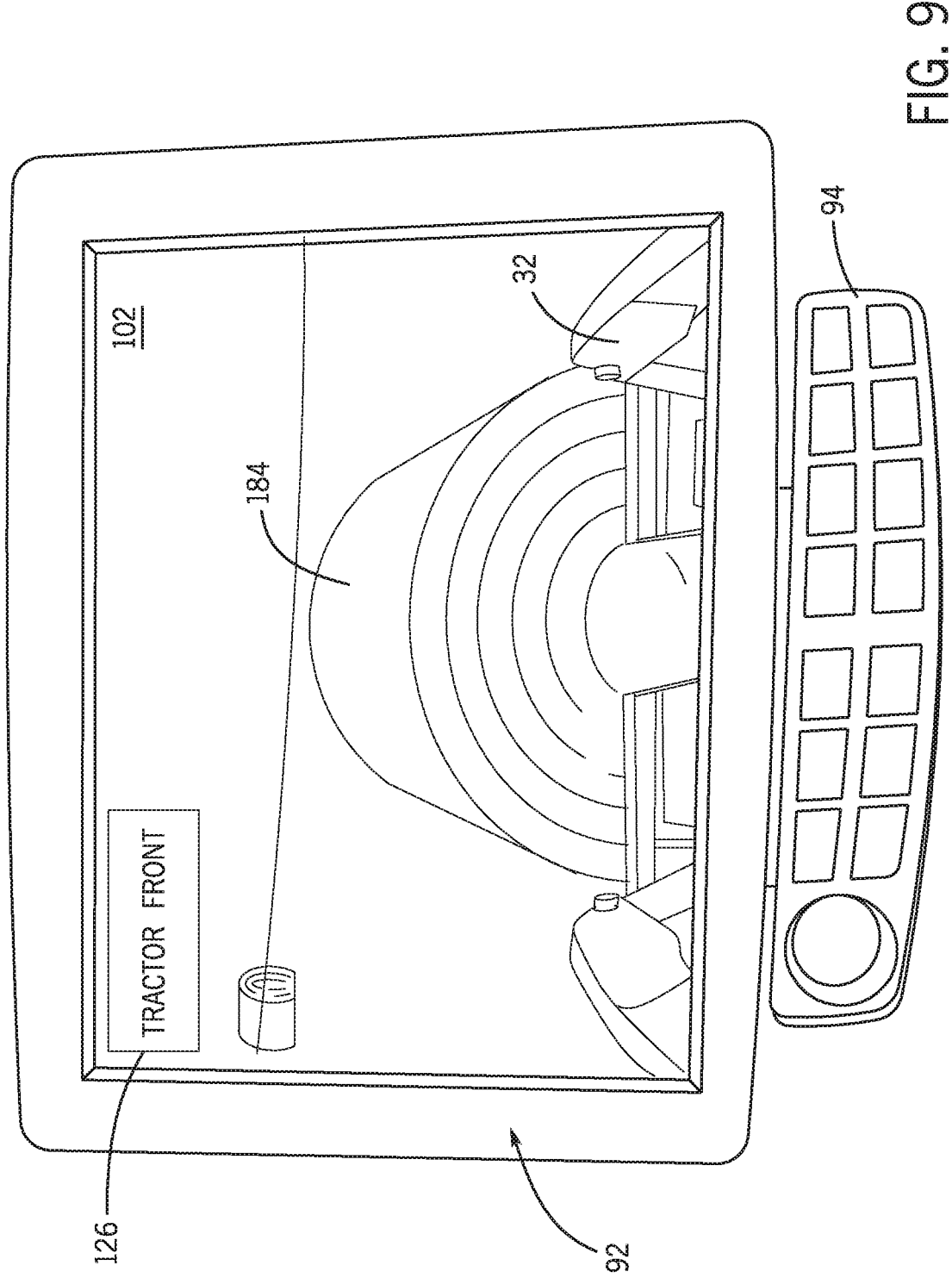
FIG. 9 illustrates a forward implement guidance display, as generated on the monitor shown in FIGS. 3-5, in an example scenario in which the implement guidance symbology is temporarily suppressed or hidden, while the work implement under consideration (here, an FEL bale spear attachment) is in a loaded state.

In certain embodiments, the controller 48 of the implement guidance display system 22 may be configured to determine when a work implement is in a loaded state; and, when so determining, suppress display of at least a portion of the implement trajectory symbology. Consider, for example, the example scenario shown in FIG. 9 in which the FEL bale spear attachment 28 now carries a hay bale 184. Here, the controller 48 has determined that the FEL bale spear attachment 28 is loaded based upon, for example, data provided by the implement sensors 70 shown in FIG. 2. In response to this determination, the controller 48 temporarily suppresses the display of the implement guidance symbology on the relevant implement guidance display(s). In the example of FIG. 9, specifically, the controller 48 suppresses display of the implement guidance symbology 104 generated on the HDD device or monitor 92 shown in FIGS. 3-5. In a similar regard, the controller 48 may suppress display of the implement guidance symbology 100 normally presented on the HUD 96 when determining that the FEL bale spear attachment 28 is in a loaded state. This may help declutter the display screen when such implement guidance symbology is unneeded or less helpful. In further embodiments, the controller 48 may not suppress display of the implement guidance symbology (and, perhaps, may otherwise alter the appearance of the implement guidance symbology) when determining that the implement under consideration is in a loaded or partially loaded state.

Finally, in certain embodiments, the controller 48 of the implement guidance display system 22 may be configured to identify an implement type corresponding to the work implement; and then further generate, on the display device, graphics representative of the identified implement type. Such graphics may be recalled from the implement attribute database 72 by the controller 48 based upon the identified implement type, with the database 72 potentially correlating such implement-specific information utilizing a multi-dimensional lookup table or any other suitable data structure. Considering the graphical depictions 124, 144 shown on the HDD monitor 92 (FIGS. 3-5) as an example, the controller 48 may alter the graphical depictions 124, 144 utilizing the data stored in the database 72 when a different work implement is attached to the loader 20. The controller 48 may determine the particular implement type currently attached to the loader 20 by sensing a tag (e.g., a radio frequency identification tag) or reading other identifying information present on the implement, by visual analysis of a camera feed capturing the implement, from operator input specifying the type of implement currently attached to the loader 20 (e.g., as selected from a drop-down menu or another graphical user interface element), or utilizing any other technique. The controller 48 may also utilize the information stored in the database 72 is generating other symbols or graphics included in the implement guidance symbology in embodiments. For example, the controller 48 may reference the database to determine the appropriate width to assign the projected implement path graphic based upon a maximum width of the implement, as stored in the database 72. Similarly, if markers designating the predicted future location of key physical features of an implement (e.g., the above-described spear tip markers) are presented on the implement guidance display, the controller 48 may further recall information defining the graphics and appropriate locations for usage in generating such markers, as previously described in connection with FIGS. 3-6.

Enumerated Examples of Implement Guidance Display Systems for Usage within Work Vehicles The following examples of the variable track joystick device are further provided, which are numbered for ease of reference.

1. An implement guidance display system is deployed onboard a work vehicle including an operator station, a work vehicle chassis, and a work implement mounted to move relative to the work vehicle chassis. In embodiments, the implement guidance display system includes a display device within the operator station of the work vehicle; implement data sources configured to provide implement tracking data pertaining to the work implement when mounted to the work vehicle chassis; and a controller in signal communication with the display device and with the implement data sources. The controller is configured to: (i) receive the implement tracking data from the implement data sources; (ii) establish a projected trajectory of the work implement utilizing the implement tracking data; and (iii) generate, on the display device, implement trajectory symbology indicative of the projected trajectory of the work implement.

2. The implement guidance display system of example 1, wherein the implement trajectory symbology includes an implement path graphic visually representing a path along which the work implement is projected to travel.

3. The implement guidance display system of example 2, wherein the controller generates the implement path graphic to have a width substantially equivalent to a maximum width of the work implement.

4. The implement guidance display system of example 2, wherein the work implement is mounted to the work vehicle chassis by a boom assembly enabling vertical movement of the work implement relative to the work vehicle chassis. The controller is further configured to determine a current vertical position of the work implement relative to the work vehicle chassis, as well as align the implement trajectory symbology with the current vertical position of the work implement.

5. The implement guidance display system of example 4, wherein the controller is further configured to generate, on the display device, graphics representative of a zero deviation implement path of the work implement. The zero deviation implement path of the work implement representing a path traveled by the work implement when in a lowered position as the work vehicle travels along a straight path.

6. The implement guidance display system of example 2, wherein the controller is configured to generate the implement path graphic in a three dimensional perspective format superimposed over a real-world view of a surrounding environment of the work implement.

7. The implement guidance display system of example 6, further including a camera providing a live video feed of the surrounding environment of the work implement. The controller is operably coupled to the camera and is configured to further generate the live video feed on the display device, while superimposing the implement path graphic over the live video feed.

8. The implement guidance display system of example 2, wherein the controller is further configured to generate, on the display device, a marker identifying an estimated orientation of a leading feature of the work implement when the work implement reaches a distal end of the path.

9. The implement guidance display system of example 1, wherein the controller is further configured to: establish a projected trajectory of the work vehicle chassis; and further generate, on the display device, graphics representative of the projected trajectory of the work vehicle chassis.

10. The implement guidance display system of example 1, wherein the controller is further configured to: identify an implement type corresponding to the work implement; and further generate, on the display device, graphics representative of the identified implement type.

11. The implement guidance display system of example 1, wherein the work implement is configured to be mounted to a front end of the work vehicle, while a second work implement is configured to be mounted to a rear end of the work vehicle. When the work implements are mounted to the front and rear ends of the work vehicle, respectively, the controller is further configured to selectively generate on the display device: a forward implement guidance display including the implement trajectory symbology indicative of the projected trajectory of the work implement; and a rear implement guidance display including additional implement trajectory symbology indicative of a projected trajectory of the second work implement.

12. The implement guidance display system of example 11, further including an operator input interface operably coupled to the controller. The controller is further configured to switch between presentation of the forward implement guidance display and the rear implement guidance display on the display device in response to operator input received via the operator input interface.

13. The implement guidance display system of example 1, wherein the controller is further configured to: determine when the work implement is in a loaded state utilizing data provided by the implement data sources; and suppress display of at least a portion of the implement trajectory symbology when the work implement is in a loaded state.

14. In further embodiments, the implement guidance display system is utilized onboard a work vehicle including an operator station, a work vehicle chassis, and a boom assembly to which different types of work implements can be attached. In such embodiments, the implement guidance display system may include a display device disposed within the operator station, an implement attribute database storing implement-specific data for multiple work implement types, and a controller in signal communication with the display device and with the implement attribute database. The controller is configured to: (i) identify a type of work implement currently attached to the work vehicle chassis by the boom assembly; (ii) recall, from the implement attribute database, implement-specific data corresponding to the identified type of work implement; and (iii) generate, on the display device, an implement guidance display including graphics indicating the type of work implement currently attached to the work vehicle chassis, as generated in accordance with the implement-specific data recalled from the implement attribute database.

15. In still other embodiments, the implement guidance display system is deployed onboard a work vehicle having a chassis supporting an operator station and a work implement configured to move relative to the work vehicle chassis. The implement guidance display system includes a display device within the operator station of the work vehicle. Implement data sources are configured to provide implement tracking data pertaining to an orientation of the work implement relative to the chassis or a combination of a heading of the work vehicle and the orientation of the work implement relative to the chassis. A controller is in signal communication with the display device and with the implement data sources. The controller is configured to receive the implement tracking data from the implement data sources, determine a projected trajectory of the work implement based on the implement tracking data; and generate, on the display device, implement trajectory symbology indicative of the projected trajectory of the work implement.

CONCLUSION

The foregoing has thus provided embodiments implement guidance display systems usefully deployed onboard work vehicles equipped with work implements. During operation, the implement guidance display system generates one or more displays presenting implement guidance symbology aiding an operator in controlling one or more work implements mounted to the front or rear of a work vehicle in an intended manner. In many instances, the implement guidance symbology will include or consist of symbology indicative of a projected trajectory of a work implement, such as graphics visually identifying a path that the work implement is projected to travel given a present set of conditions; e.g., operator input commands, the current orientation of the work implement if independently movable relative to the work vehicle chassis, and possibly sensor data indicative of a current motion state of the work implement. Additionally, when generated, the graphics representing the projected path of the work implement may further convey other useful information, such as a maximum width of the work implement and projected future location(s) of key features of the work implement. By rapid visual reference to the implement guidance symbology, an operator gain improved awareness of the likely path followed by a work implement given a present set of conditions, thereby allowing the operator to better guide the implement along an optimal path when carrying-out a task demanding relatively precise control of implement movement.

Embodiments of the implement guidance display system may also improve visibility or situational awareness of the surrounding environment in which a particular task is conducted by, for example, enabling an operator to switch between different views of the implement work area, with the implement guidance symbology integrated into the selected view accordingly. Additionally, embodiments the implement guidance display system may generate multiple different displays for different work implements, such a forward implement guidance display including implement guidance symbology corresponding to a front implement of the work vehicle and a rear implement guidance display including implement guidance symbology corresponding to a rear implement of the work vehicle. In such embodiments, an operator may be permitted to switch between the implement guidance display, or the system may automatically select the appropriate guidance display, based upon the particular direction in which the work vehicle is presently traveling and/or the particular work implement currently controlled by the operator. Still over benefits and features are provided by embodiments of the implement guidance display system, as will be appreciated given the benefit of the foregoing description and the above-described drawings figures.

While primary described above in connection with a particular type of work vehicle (a tractor or loader) and particular types of work implements (bale spear attachments), embodiments of the implement guidance display system can be utilized in conjunction with various other work vehicles and implements, with corresponding changes to the implement guidance symbology. For example, in embodiments, the implement guidance display system may be utilized in conjunction with work implements movable in various different degrees of freedom (e.g., excavator end effectors and feller buncher heads) to changes the attitude, orientation, vertical elevation, and other spatial aspects of the implement. In such instances, the work implement under consideration may be supported by a boom assembly articulable in vertical directions, horizontal (side-to-side) directions, and so on, with the resulting curvature of any projected implement trajectory path (as generated on one or more implement guidance displays) varying accordingly. So too may markers, icons, or other such graphics identifying the projected future orientation of key implement features (e.g., the saw blade of a feller buncher head) also vary in accordance with the type of implement under consideration.

In one embodiment, the implement guidance display system is deployed onboard a work vehicle having a chassis supporting an operator station and a work implement configured to move relative to the work vehicle chassis. The implement guidance display system may include a display device within the operator station of the work vehicle, implement data sources configured to provide implement tracking data (e.g., describing a heading of the work vehicle, an orientation of the work implement, and/or a position of the work implement relative to the chassis) and a controller in signal communication with the display device and with the implement data sources. The controller is configured to:

(i) receive the implement tracking data from the implement data sources; (ii) determine a projected trajectory of the work implement based on the implement tracking data; and (iii) generate, on the display device, implement trajectory symbology indicative of the projected trajectory of the work implement.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An implement guidance display system deployed onboard a work vehicle including an operator station, a work vehicle chassis, and a work implement mounted to move relative to the work vehicle chassis, the implement guidance display system comprising:
    a display device within the operator station of the work vehicle;
    implement data sources configured to provide implement tracking data pertaining to the work implement when mounted to the work vehicle chassis; and
    a controller in signal communication with the display device and with the implement data sources, the controller configured to:
        receive the implement tracking data from the implement data sources;
        establish a projected trajectory of the work implement utilizing the implement tracking data;
        generate, on the display device, implement trajectory symbology having length and width and indicative of the projected trajectory of the work implement in a three-dimensional perspective format;
        establish a projected trajectory of the work vehicle chassis; and
        generate, on the display device, graphics representative of the projected trajectory of the work vehicle chassis;
        wherein the implement trajectory symbology is graphically projected onto a plane separate from that of the graphics representative of the projected trajectory of the work vehicle chassis.
2. The implement guidance display system of claim 1, wherein the implement trajectory symbology comprises an implement path graphic visually representing a path along which the work implement is projected to travel.

3. The implement guidance display system of claim 2, wherein the controller generates the implement path graphic to have a width substantially equivalent to a maximum width of the work implement.
4. The implement guidance display system of claim 2, wherein the work implement is mounted to the work vehicle chassis by a boom assembly enabling vertical movement of the work implement relative to the work vehicle chassis; and
    wherein the controller is further configured to:
        determine a current vertical position of the work implement relative to the work vehicle chassis; and
        align the implement trajectory symbology with the current vertical position of the work implement.
5. The implement guidance display system of claim 4, wherein the controller is further configured to generate, on the display device, graphics representative of a zero deviation implement path of the work implement;
    the zero deviation implement path of the work implement representing a path traveled by the work implement when in a lowered position as the work vehicle travels along a straight path.
6. The implement guidance display system of claim 2, wherein the controller is configured to generate the implement path graphic superimposed over a real-world view of a surrounding environment of the work implement.
7. The implement guidance display system of claim 6, further comprising a camera providing a live video feed of the surrounding environment of the work implement;
    wherein the controller is operably coupled to the camera and is configured to further generate the live video feed on the display device, while superimposing the implement path graphic over the live video feed.
8. The implement guidance display system of claim 2, wherein the controller is further configured to generate, on the display device, a marker identifying an estimated orientation of a leading feature of the work implement when the work implement reaches a distal end of the path.
9. The implement guidance display system of claim 8, wherein the work implement comprises a bale spear attachment; and
    wherein the leading feature comprises a tip of at least one bale spear included in the bale spear attachment.
10. The implement guidance display system of claim 1, wherein the controller is further configured to:
    identify an implement type corresponding to the work implement; and
    further generate, on the display device, graphics representative of the identified implement type.
11. The implement guidance display system of claim 1, wherein the work implement is configured to be mounted to a front end of the work vehicle, while a second work implement is configured to be mounted to a rear end of the work vehicle; and
    wherein, when the work implements are mounted to the front and rear ends of the work vehicle, respectively, the controller is further configured to selectively generate on the display device:
        a forward implement guidance display including the implement trajectory symbology indicative of the projected trajectory of the work implement; and
        a rear implement guidance display including additional implement trajectory symbology indicative of a projected trajectory of the second work implement.
12. The implement guidance display system of claim 11, further comprising an operator input interface operably coupled to the controller;

wherein the controller is further configured to switch between presentation of the forward implement guidance display and the rear implement guidance display on the display device in response to operator input received via the operator input interface.

13. The implement guidance display system of claim 1, wherein the controller is further configured to:
determine when the work implement is in a loaded state utilizing data provided by the implement data sources; and
suppress display of at least a portion of the implement trajectory symbology when the work implement is in a loaded state.

14. An implement guidance display system utilized onboard a work vehicle including an operator station, a work vehicle chassis, and a boom assembly to which different types of work implements can be attached, the implement guidance display system comprising:
a display device disposed within the operator station;
an implement attribute database storing implement-specific data for multiple work implement types;
an implement tracking database pertaining to the work implement when mounted to the work vehicle chassis; and
a controller in signal communication with the display device and with the implement attribute database, the controller configured to:
identify a type of work implement currently attached to the work vehicle chassis by the boom assembly;
recall, from the implement attribute database, implement-specific data corresponding to the identified type of work implement;
generate, on the display device, an implement guidance display including graphics indicating the type of work implement currently attached to the work vehicle chassis, as generated in accordance with the implement-specific data recalled from the implement attribute database;
receive the implement tracking data from the implement data sources;
establish a projected trajectory of the work implement utilizing the implement tracking data;
generate, on the display device, implement trajectory symbology having length and width and indicative of the projected trajectory of the work implement in a three-dimensional perspective format;
establish a projected trajectory of the work vehicle chassis; and
generate, on the display device, graphics representative of the projected trajectory of the work vehicle chassis;
wherein the implement trajectory symbology is graphically projected onto a plane separate from that of the graphics representative of the projected trajectory of the work vehicle chassis.

15. The implement guidance display system of claim 14, further comprising implement data sources coupled to the controller and providing thereto data indicative of a type of work implement currently attached to the work vehicle chassis by the boom assembly;
wherein the controller is configured to identify the work implement type based, at least in part, on the data provided by the implement data sources.

16. The implement guidance display system of claim 14, further comprising operator input in signal communication with the controller;
wherein the controller is configured to identify the work implement type based, at least in part, on operator input data received via the operator input.

17. The implement guidance display system of claim 16, wherein the implement-specific data describes a graphical depiction of at least a portion of the work implement; and
wherein the controller generates the graphics to include the graphical depiction.

18. The implement guidance display system of claim 16, wherein the implement-specific data specifies a maximum width of the type of work implement currently attached to the work vehicle chassis;
wherein the controller is configured to generate the implement trajectory symbology to comprise an implement path graphic having a maximum width corresponding to a maximum width of the work implement.

19. An implement guidance display system deployed onboard a work vehicle having a chassis supporting an operator station and a work implement configured to move relative to the work vehicle chassis, the implement guidance display system comprising:
a display device within the operator station of the work vehicle;
implement data sources configured to provide implement tracking data pertaining to an orientation of the work implement relative to the chassis and a combination of a heading of the work vehicle and the orientation of the work implement relative to the chassis; and
a controller in signal communication with the display device and with the implement data sources, the controller configured to:
receive the implement tracking data from the implement data sources;
determine a projected trajectory of the work implement based on the implement tracking data; and
generate, on the display device, implement trajectory symbology having length and width and indicative of the projected trajectory of the work implement in a three-dimensional perspective format;
establish a projected trajectory of the work vehicle chassis; and
generate, on the display device, graphics representative of the projected trajectory of the work vehicle chassis;
wherein the implement trajectory symbology is graphically projected onto a plane separate from that of the graphics representative of the projected trajectory of the work vehicle chassis.

* * * * *